US012747622B2

(12) United States Patent
Conway et al.

(10) Patent No.: US 12,747,622 B2
(45) Date of Patent: Sep. 29, 2026

(54) SYSTEMS AND METHODS FOR A DOOR MONITORING SYSTEM FOR BRAKING A DOOR OPERATED BY A DOOR SYSTEM

(71) Applicant: ASSA ABLOY Accessories and Door Controls Group, Inc., New Haven, CT (US)

(72) Inventors: Matthew Conway, Monroe, NC (US); Daniel Dunham, Monroe, NC (US)

(73) Assignee: ASSA ABLOY Accessories and Door Controls Group, Inc., New Haven, CT (US)

( * ) Notice: Subject to any disclaimer, the term of this patent is extended or adjusted under 35 U.S.C. 154(b) by 156 days.

(21) Appl. No.: 18/768,987

(22) Filed: Jul. 10, 2024

(65) Prior Publication Data

US 2025/0020015 A1 Jan. 16, 2025

Related U.S. Application Data

(60) Provisional application No. 63/526,325, filed on Jul. 12, 2023.

(51) Int. Cl.

| | |
|---|---|
| ***E05F 5/02*** | (2006.01) |
| ***E05F 15/40*** | (2015.01) |
| ***E05F 15/60*** | (2015.01) |
| ***E05F 15/611*** | (2015.01) |
| ***E05F 15/70*** | (2015.01) |

(52) U.S. Cl.

CPC ......... *E05F 5/027* (2013.01); *E05Y 2201/412* (2013.01); *E05Y 2400/302* (2013.01); *E05Y 2400/32* (2013.01); *E05Y 2400/36* (2013.01)

(58) Field of Classification Search

CPC ........................................................ E05F 5/027

See application file for complete search history.

(56) References Cited

U.S. PATENT DOCUMENTS

| | | | | |
|---|---|---|---|---|
| 2018/0313129 | A1* | 11/2018 | Hucker | H02P 3/22 |
| 2018/0328097 | A1* | 11/2018 | Holt | B60J 5/04 |
| 2019/0226262 | A1* | 7/2019 | Tsuboi | E05F 15/40 |
| 2019/0242172 | A1* | 8/2019 | Hucker | E05F 3/02 |
| 2019/0277078 | A1* | 9/2019 | Baruco | E05F 15/686 |

* cited by examiner

*Primary Examiner* — Davetta W Goins
*Assistant Examiner* — Pameshanand Mahase
(74) *Attorney, Agent, or Firm* — Wolf, Greenfield & Sacks, P.C.

(57) ABSTRACT

A door monitoring system included a braking system. The present disclosure may include a position sensor that determines a position of a door; a position filter in series with the position sensor to generate a position signal; a speed filter to generate a speed signal from the position signal; an anticipation circuit to determine an anticipated position of the door at a future period based on the position signal and the speed signal; determine, based on the anticipated position, an anticipated speed; and determine whether the anticipated speed exceeds an allowable speed and engage a relay configured to disconnect a drive circuit and connect at least one braking resistor to a motor to slow the speed of the door. In some aspects, the braking system comprises at least one controller for performing one or more of the above steps.

27 Claims, 25 Drawing Sheets

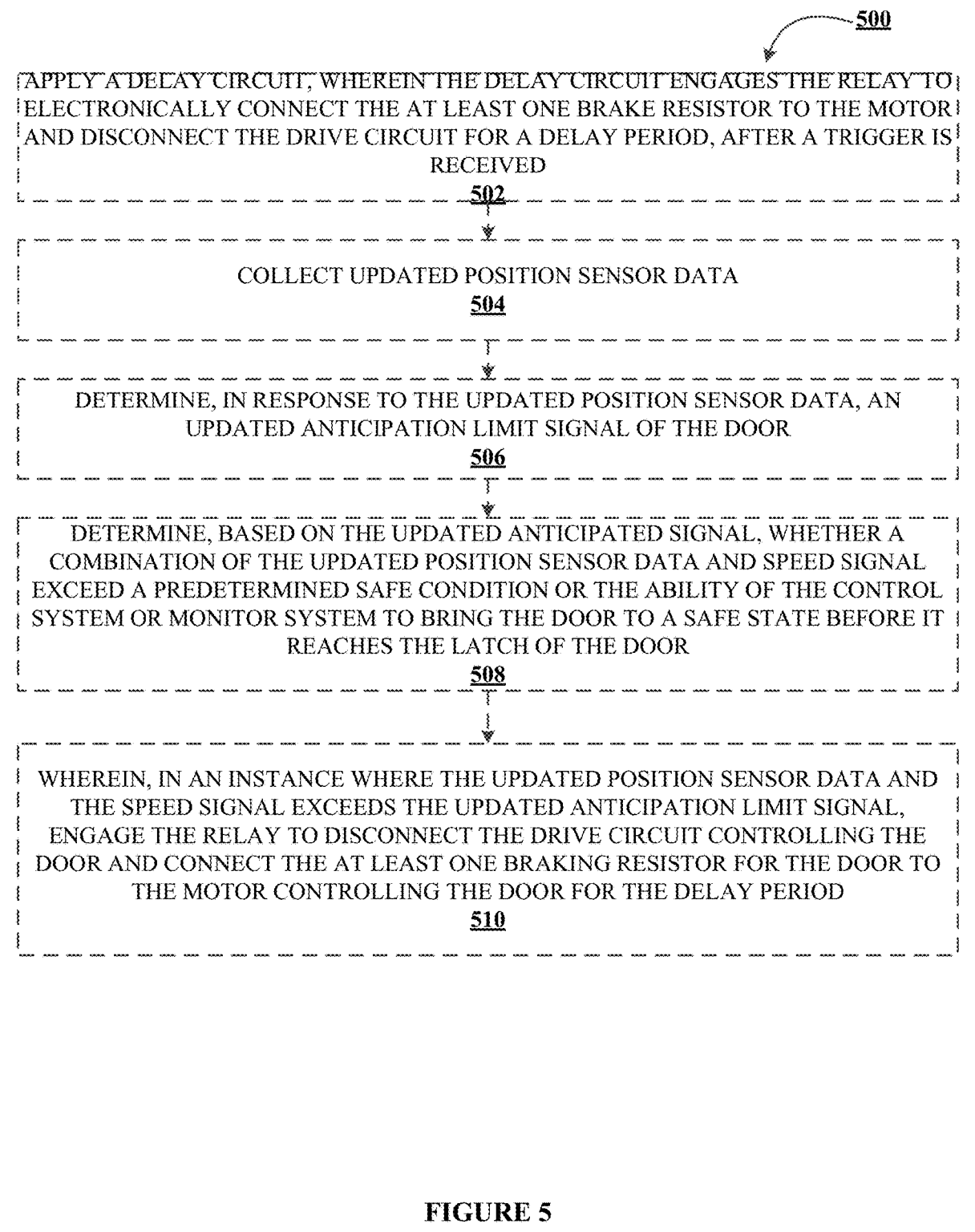

500

APPLY A DELAY CIRCUIT, WHEREIN THE DELAY CIRCUIT ENGAGES THE RELAY TO ELECTRONICALLY CONNECT THE AT LEAST ONE BRAKE RESISTOR TO THE MOTOR AND DISCONNECT THE DRIVE CIRCUIT FOR A DELAY PERIOD, AFTER A TRIGGER IS RECEIVED
502

COLLECT UPDATED POSITION SENSOR DATA
504

DETERMINE, IN RESPONSE TO THE UPDATED POSITION SENSOR DATA, AN UPDATED ANTICIPATION LIMIT SIGNAL OF THE DOOR
506

DETERMINE, BASED ON THE UPDATED ANTICIPATED SIGNAL, WHETHER A COMBINATION OF THE UPDATED POSITION SENSOR DATA AND SPEED SIGNAL EXCEED A PREDETERMINED SAFE CONDITION OR THE ABILITY OF THE CONTROL SYSTEM OR MONITOR SYSTEM TO BRING THE DOOR TO A SAFE STATE BEFORE IT REACHES THE LATCH OF THE DOOR
508

WHEREIN, IN AN INSTANCE WHERE THE UPDATED POSITION SENSOR DATA AND THE SPEED SIGNAL EXCEEDS THE UPDATED ANTICIPATION LIMIT SIGNAL, ENGAGE THE RELAY TO DISCONNECT THE DRIVE CIRCUIT CONTROLLING THE DOOR AND CONNECT THE AT LEAST ONE BRAKING RESISTOR FOR THE DOOR TO THE MOTOR CONTROLLING THE DOOR FOR THE DELAY PERIOD
510

FIGURE 5

SYSTEMS AND METHODS FOR A DOOR MONITORING SYSTEM FOR BRAKING A DOOR OPERATED BY A DOOR SYSTEM

CROSS-REFERENCE TO RELATED APPLICATIONS

This application claims the benefit of priority under 35 U.S.C. § 119 (e) to U.S. Provisional Application Ser. No. 63/526,325 titled "SYSTEMS AND METHODS FOR A DOOR MONITORING SYSTEM FOR BRAKING A DOOR OPERATED BY A DOOR SYSTEM" filed on Jul. 12, 2023, which is hereby incorporated by reference in its entirety.

TECHNOLOGICAL FIELD

Example embodiments of the present disclosure relate to door systems and methods of use, and more particularly to a door monitoring system that implements a door braking system.

BACKGROUND

Door system (e.g., door operators or door closers) and other such automatic entrance and exit systems can undergo issues when their control systems (e.g., any device used to control the operation of the door) have electrical damage or failures, bugs or other issues, or components of the door systems are not operating properly (e.g., are worn, broken, or the like). Such issues may be exacerbated when specific requirements, such as Underwriters Laboratories' (UL) requirements or other industry standards or regulatory requirements, are involved. For instance, requirements may change over time, and as such, may be difficult to follow at all instances, especially when accounting for the possibility of damage, glitches and bugs that could be present in the electronics or software of the door systems. Thus, there exists a need for improvements to the operation of the door systems.

BRIEF SUMMARY

Systems, methods, and computer program products are provided for implementing a door monitoring system having a door braking system.

In one aspect, a door monitoring system for a door system operatively coupled to a door and configured to close the door is provided. The door monitoring system may comprise: one or more sensors, wherein the one or more sensors are used to determine one or more operating parameters of the door being operated by the door system; and a braking system, wherein the braking system is engaged to slow the door when one of the one or more operating parameters are outside of one or more threshold operating parameters.

In some embodiments, the door monitoring system may additionally comprise: wherein the one or more sensors comprise a position sensor that determines a position of a door, wherein the braking system comprises: a position sensor, wherein the position sensor determines a position of a door by generating a position signal; a speed filter, the speed filter configured to generate a speed signal from the position signal; an anticipation circuit, wherein the anticipation circuit is configured to generate an anticipation signal, and wherein the anticipation signal is based on at least one of a latch-check position signal and the speed signal or a maximum speed signal and the position signal; and wherein the braking system is configured to: determine when the anticipated speed exceeds an allowable speed or when the speed signal exceeds the anticipation signal, and in response engage a relay to disconnect a drive circuit of the door system controlling the door and connect at least one braking resistor to a motor controlling the door to slow the door.

In some embodiments, the relay comprises a normally closed terminal connection to the at least one braking resistor for the motor.

In some embodiments, the relay comprises a normally closed terminal connection to the drive circuit.

In some embodiments, the braking system is further configured to determine when the anticipated speed fails to exceed the allowable speed and in response engage the relay configured to connect the drive circuit of the door system controlling the door to the motor controlling the door.

In some embodiments, a position filter is in series with the position sensor and is configured to filter and condition the position signal, and wherein the relay configured to connect the at least one braking resistor for the door further comprises inputting a current associated with the motor to the at least one braking resistor to generate braking torque for the door system.

In some embodiments, a portion of the position signal of the door from the position sensor comprises a latch check position, and wherein the latch check position is a latch check region comprising one or more latch check positions for the door. In some embodiments, the one or more latch check positions for the door is pre-determined. In some embodiments, the braking system further configured to: determine a pre-latch check region, wherein the pre-latch check region comprises one or more different positions of the door different than the latch check region; determine a distance of the door to the latch check region at a current time based on the position signal; generate an anticipation limit signal based on combining the allowable speed and the distance of the door to the latch check region; and compare the anticipation limit signal and the speed signal to determine the anticipation signal. In some embodiments, the braking system is further configured to: determine a pre-latch check region, wherein the pre-latch check region comprises one or more different positions of the door different than the latch check region; generate an anticipation limit signal based on combining the speed signal and a position region signal, wherein the position region signal is based on the pre-latch region; and compare the anticipation limit signal and the position signal to determine the anticipation signal.

In some embodiments, the braking system is further configured to: determine a motor current from a current sensor for the motor controlling the door based on the output of the drive circuit; and determine when the motor current for the motor controlling the door exceeds a pre-determined motor current and engage the relay configured to disconnect the drive circuit controlling the door and connect the at least one braking resistor to the motor controlling the door to slow the door. In some embodiments, when at least one of the anticipated speed fails to exceed the allowable speed or when the motor current for the motor controller the door fails to exceed the pre-determined motor current and engage the relay to connect the drive circuit to the motor controlling the door.

In some embodiments, the anticipated position and anticipated speed are based on a linear model.

In some embodiments, the braking system further comprises: a delay circuit, wherein the delay circuit engages the relay to electronically connect the at least one brake resistor to the motor controlling the door for a delay period.

In some embodiments, the braking system is further configured to: receive updated position signal from the position sensor in response to the delay circuit engaging the relay for the delay period; determine an updated anticipated speed for door based on the updated position signal; and determine when the updated anticipated speed exceeds the allowable speed engage the relay to disconnect the drive circuit of the door system controlling the door and connect the at least one braking resistor to the motor for controlling the door to slow the door for the delay period.

In some embodiments, the at least one braking resistor comprises a plurality of braking resistors.

In some embodiments, the sensor is a speed sensor.

In some embodiments, the braking system is configured such that a braking that is applied to the door to slow the door is variable.

In some embodiments, the braking system is configured such that an amount of braking applied to the door and/or a time at which braking is applied to the door is variable.

In some embodiments, the amount of braking applied to the door and/or the time at which braking is applied to the door is variable based on the one or more operating parameters of the door and/or one or more characteristics of the door In some embodiments, the one or more characteristics of the door comprise a weight of the door.

In another aspect, a braking system for a door system operatively coupled to a door and configured to close the door is provided. The braking system may comprise: a position filter configured to generate a position signal, wherein the position signal is received from a position sensor for the door; a speed filter, the speed filter configured to generate a speed signal from the position signal; an anticipation circuit, wherein the anticipation circuit is configured to determine an anticipated position of the door at a future period, and wherein the anticipated position is based on the position signal and the speed signal; wherein the braking system is configured to: determine an anticipated speed based on the anticipated position; and determine when the anticipated speed exceeds an allowable speed and in response engage a relay to disconnect a drive circuit of the door system controlling the door and connect at least one braking resistor to a motor controlling the door to slow the door.

In some embodiments, the braking system is further configured to determine when the anticipated speed fails to exceed the allowable speed and in response engage the relay configured to connect the drive circuit of the door system controlling the door to the motor controlling the door.

In another aspect, a method for operating a door braking system is provided. In some embodiments, the method may comprise: determining, by a position sensor for a door, a position of the door; generating, by a position filter operatively coupled to the position sensor, a position signal; generating, by a speed filter operatively coupled to the position filter, a speed signal based on the position signal; determining, by an anticipation circuit configured to receive the position signal and the speed signal, an anticipated position of the door at a future period; determining, based on the anticipated position, an anticipated speed; and determining, based on the anticipated speed, when the anticipated speed exceeds an allowable speed and engage a relay configured to disconnect a drive circuit of the door system controlling the door and connect at least one braking resistor to a motor controlling the door to slow the door.

In another aspect, there is provided a braking system for a door system operatively coupled to a door and configured to close the door, the braking system comprising: a position sensor configured to sense a position of the door; at least one controller configured to: determine a speed of the door based on output from the position sensor; determine an anticipated position of the door at a future period, and wherein the anticipated position is based on the output of the position sensor and the determined speed of the door; determine an anticipated speed based on the anticipated position; and determine when the anticipated speed exceeds an allowable speed and in response engage a relay to disconnect a drive circuit of the door system controlling the door and connect at least one braking resistor to a motor controlling the door to slow the door.

In some embodiments, the braking system further comprises a position filter configured to generate a position signal, wherein the position signal is received from the position sensor for the door.

In another aspect, there is provided a method for operating a door braking system, the method comprising: determining, by a position sensor for a door, a position of the door; determining, based on the output of the position sensor, a speed of the door; determining, based on the output of the position sensor and the determined speed of the door, an anticipated position of the door at a future period; determining, based on the anticipated position, an anticipated speed; and determining, based on the anticipated speed, when the anticipated speed exceeds an allowable speed and engage a relay configured to disconnect a drive circuit of the door braking system controlling the door and connect at least one braking resistor to a motor controlling the door to slow the door.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
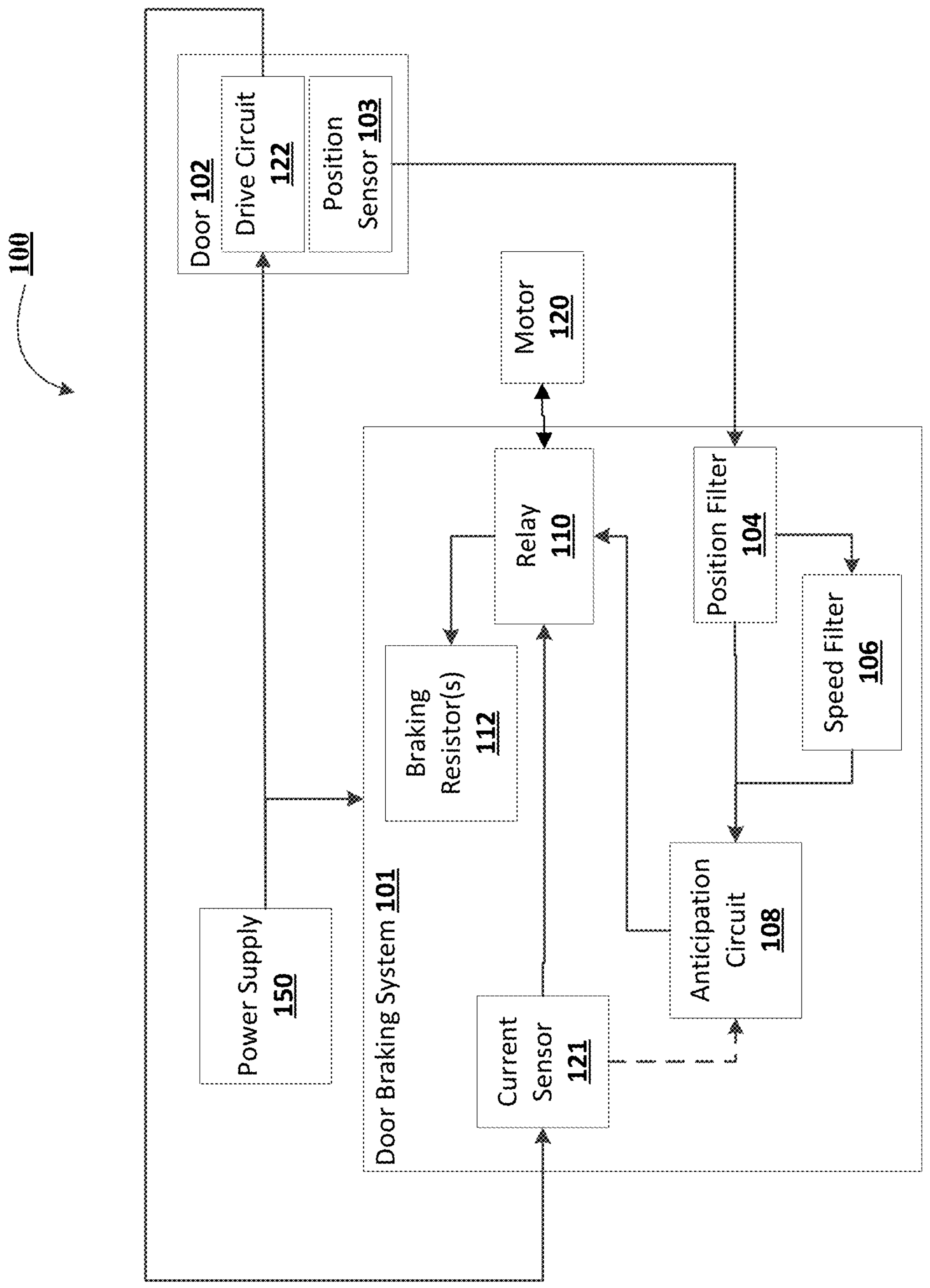
Figure 1B:
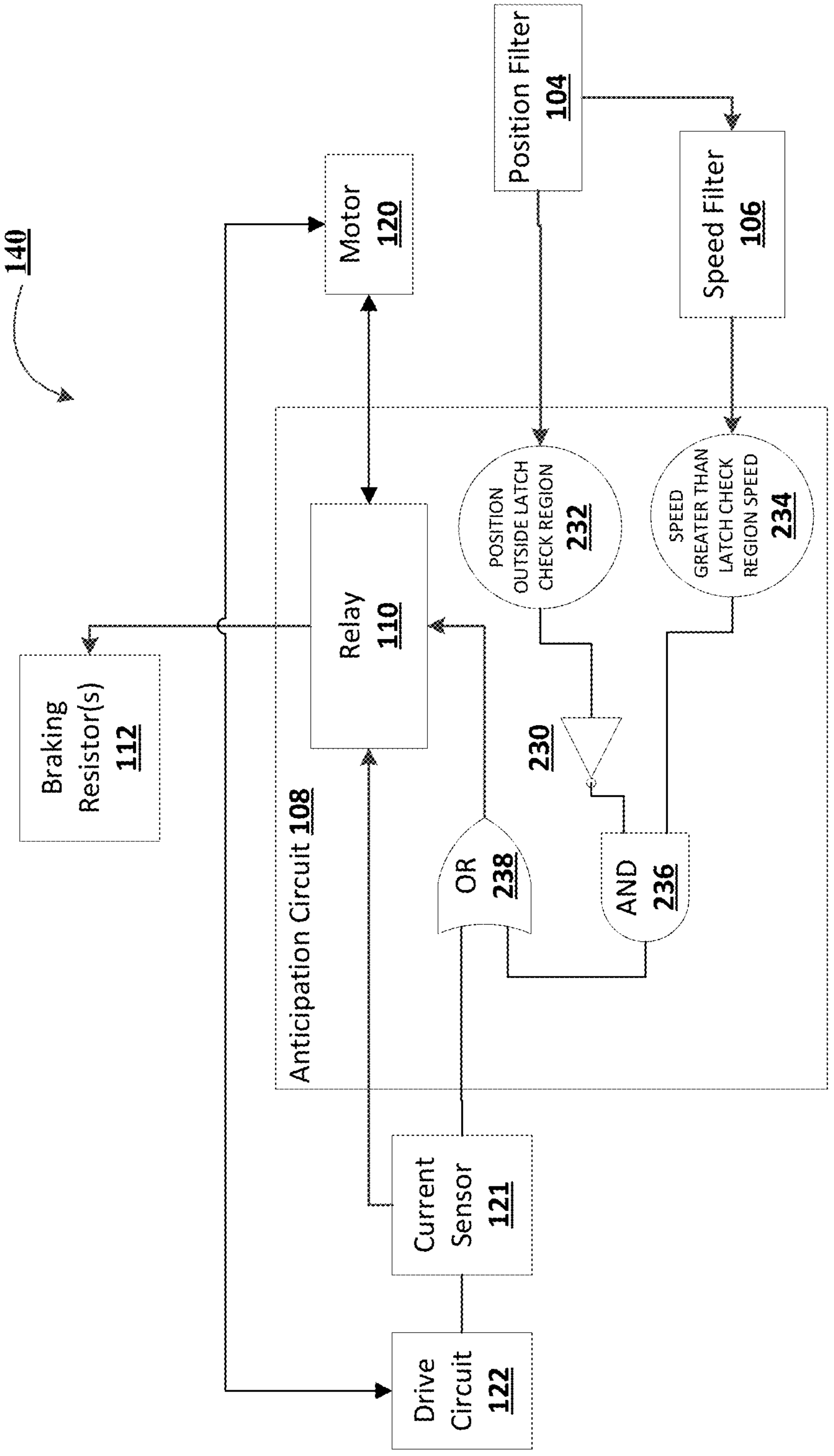
Figure 1C:
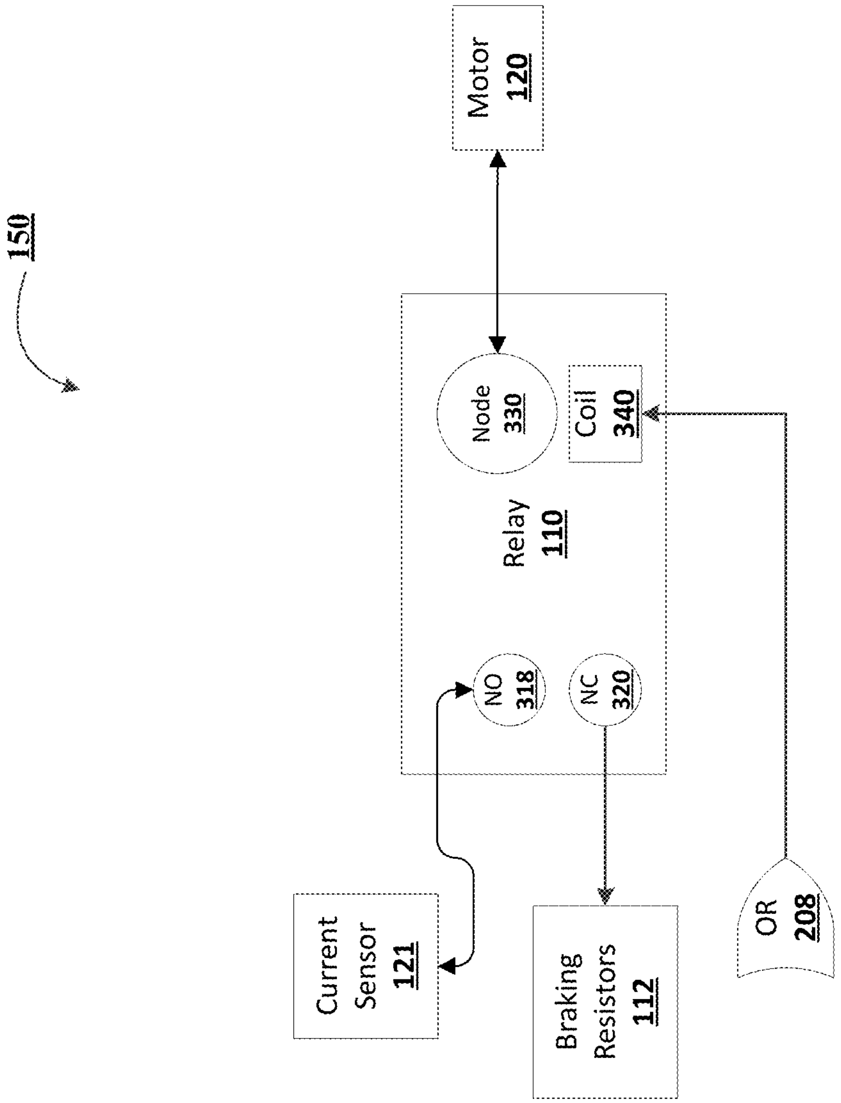
Figure 1D:
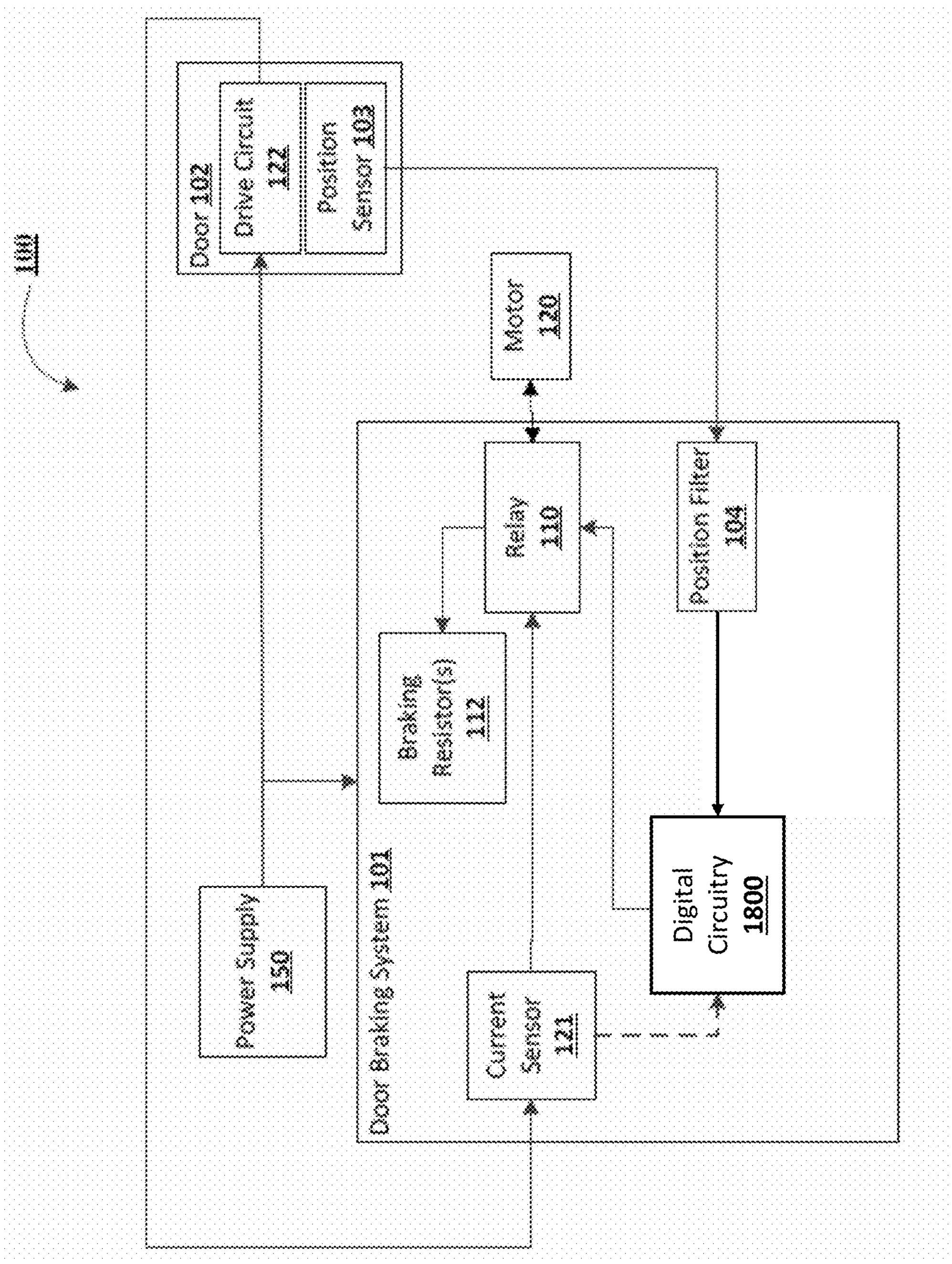
Figure 1E:
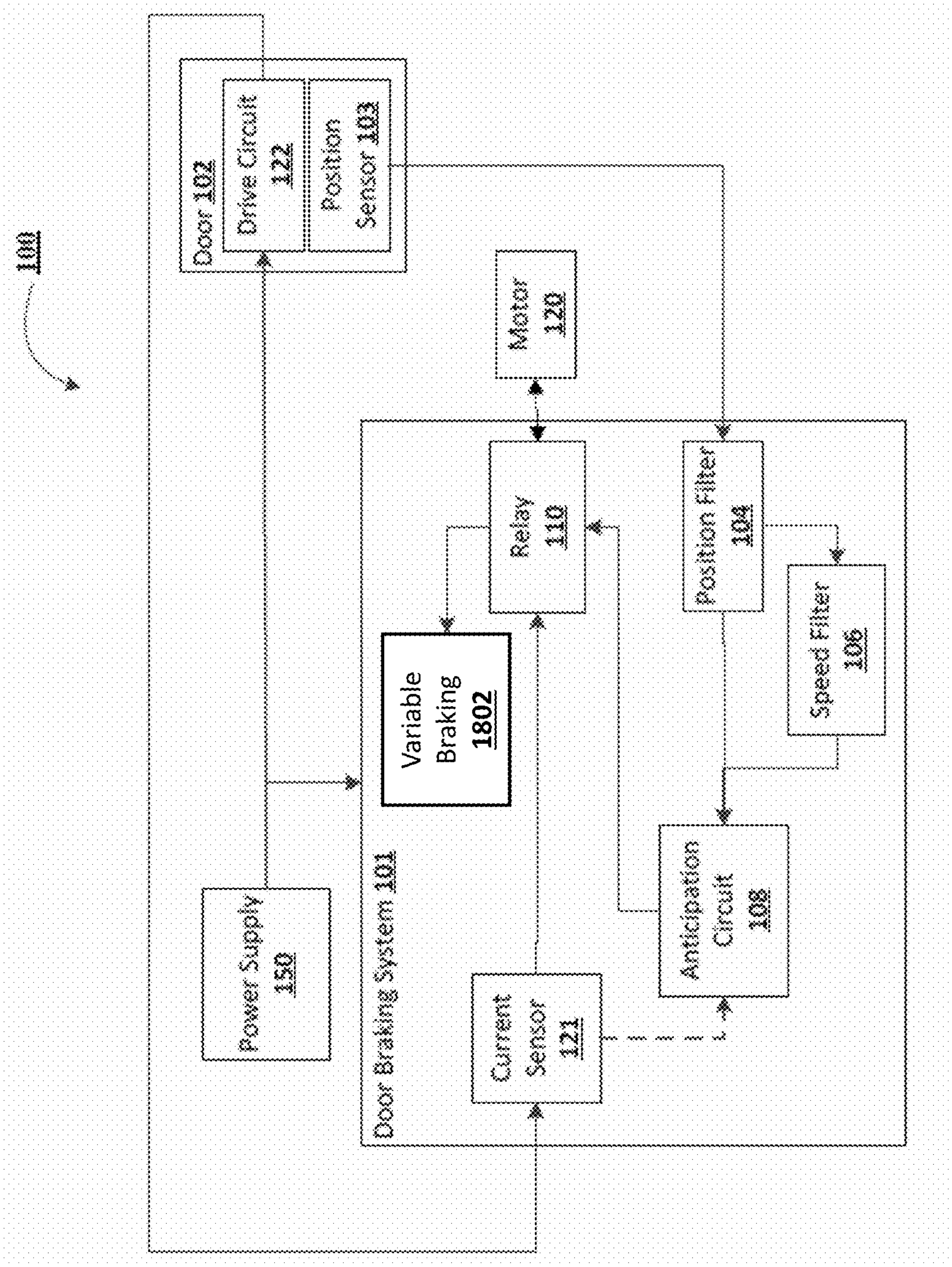
Figure 1F:
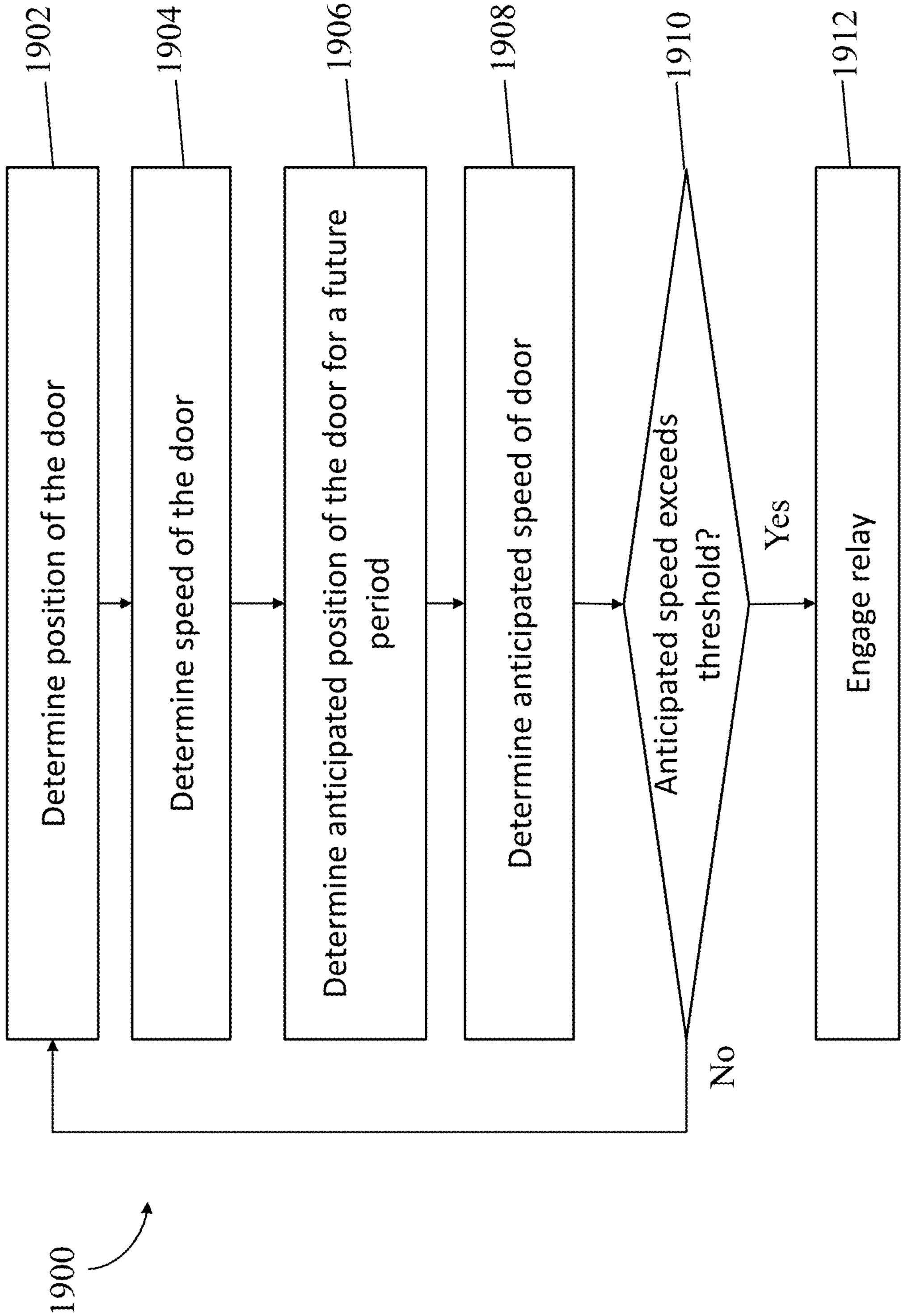
Figure 2:
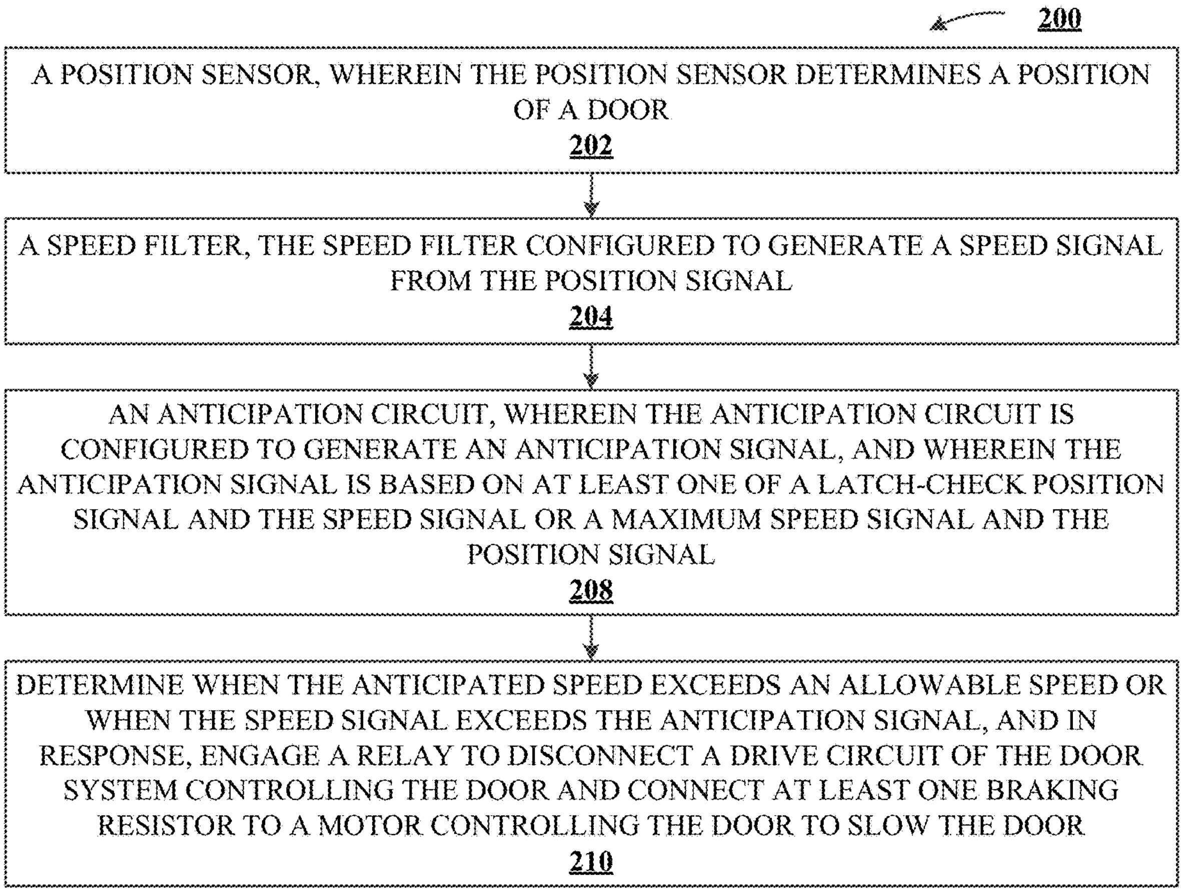
Figure 3:
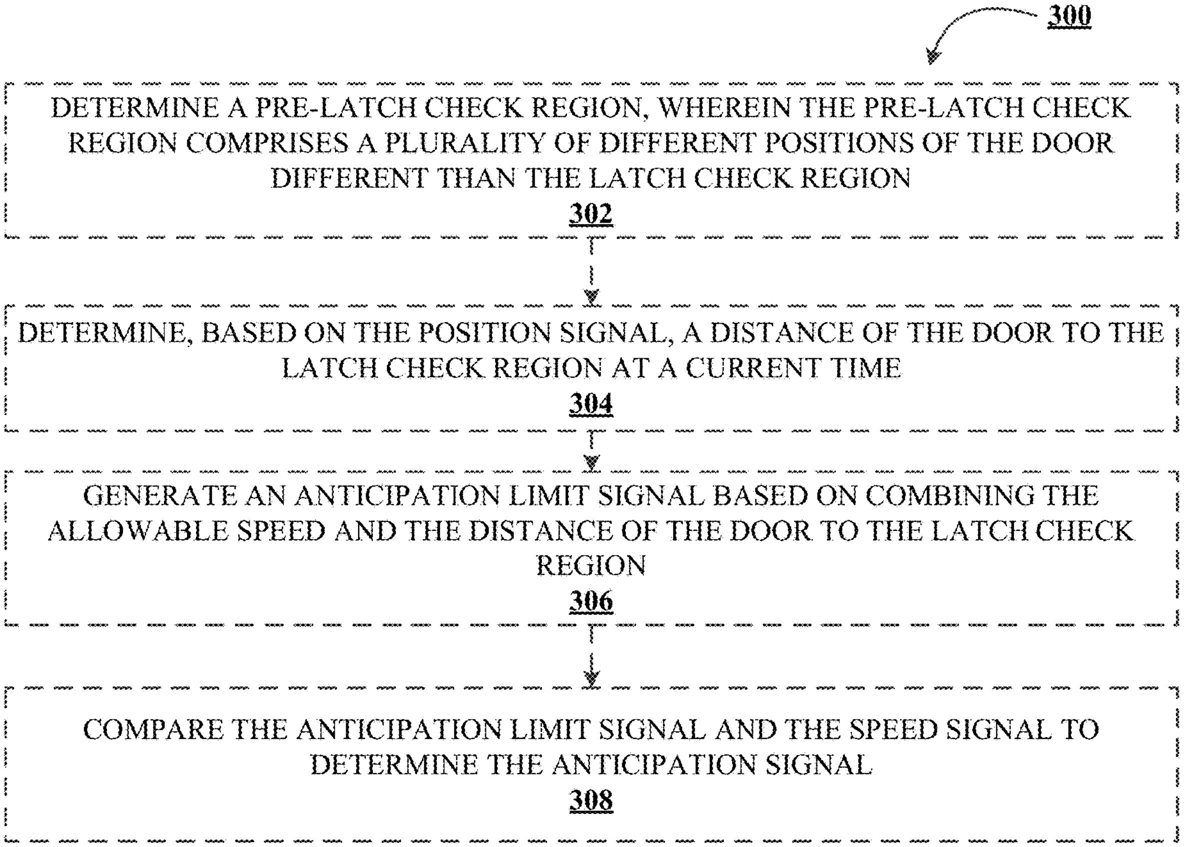
Figure 4:
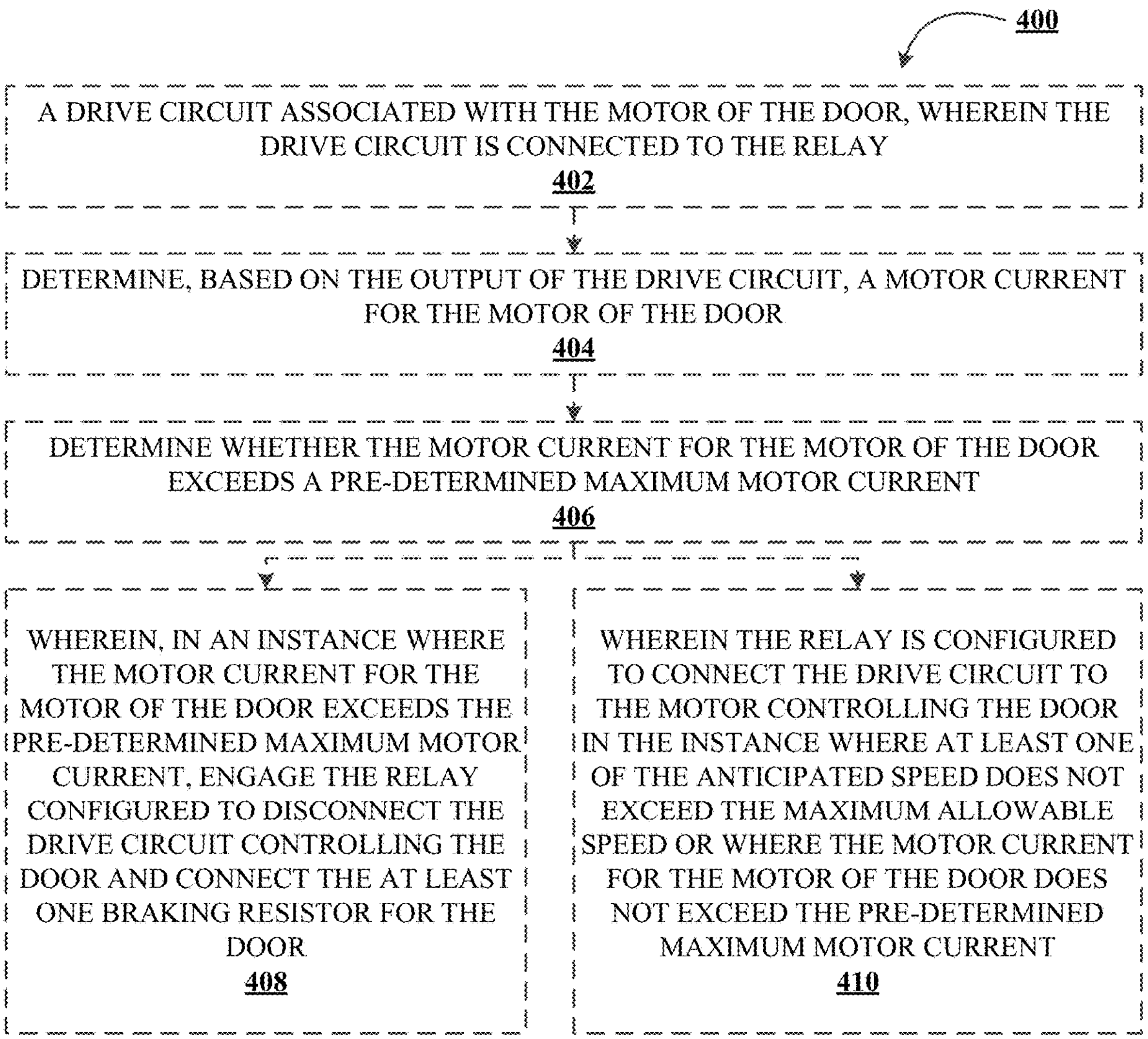
Figure 6A:
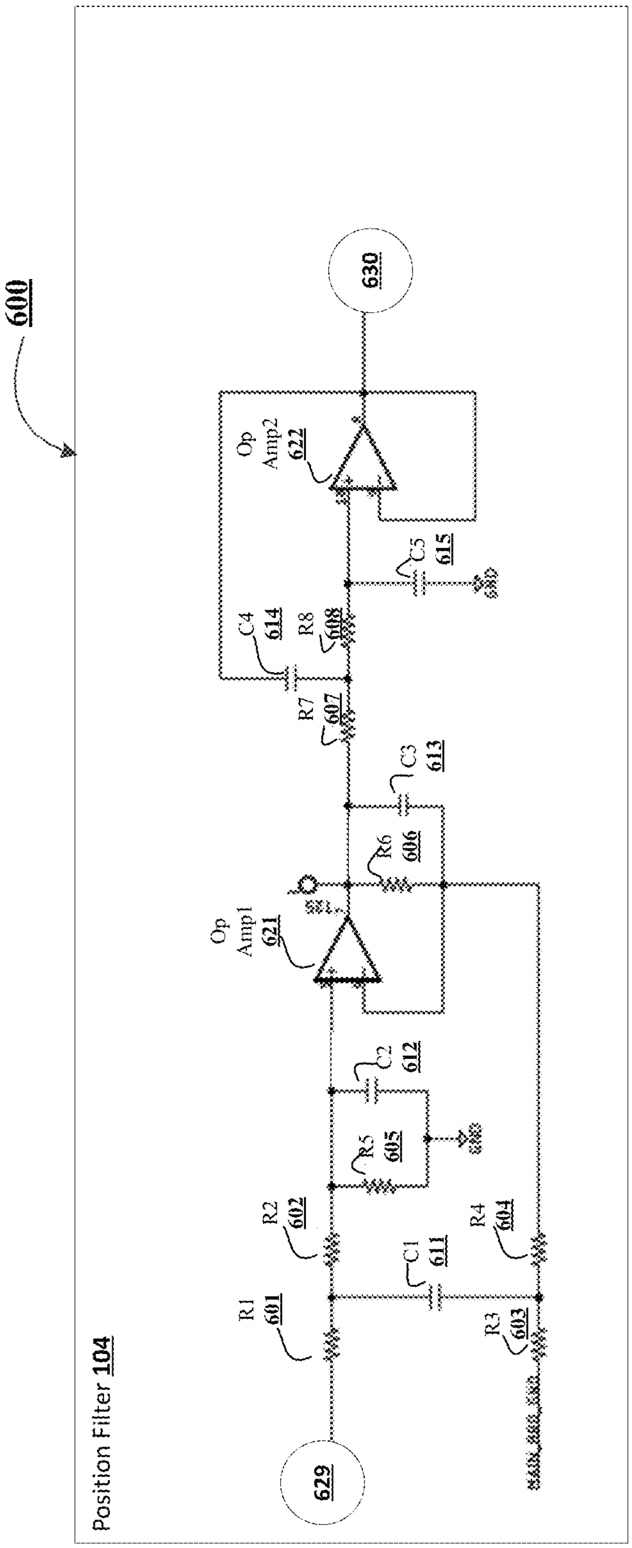
Figure 6B:
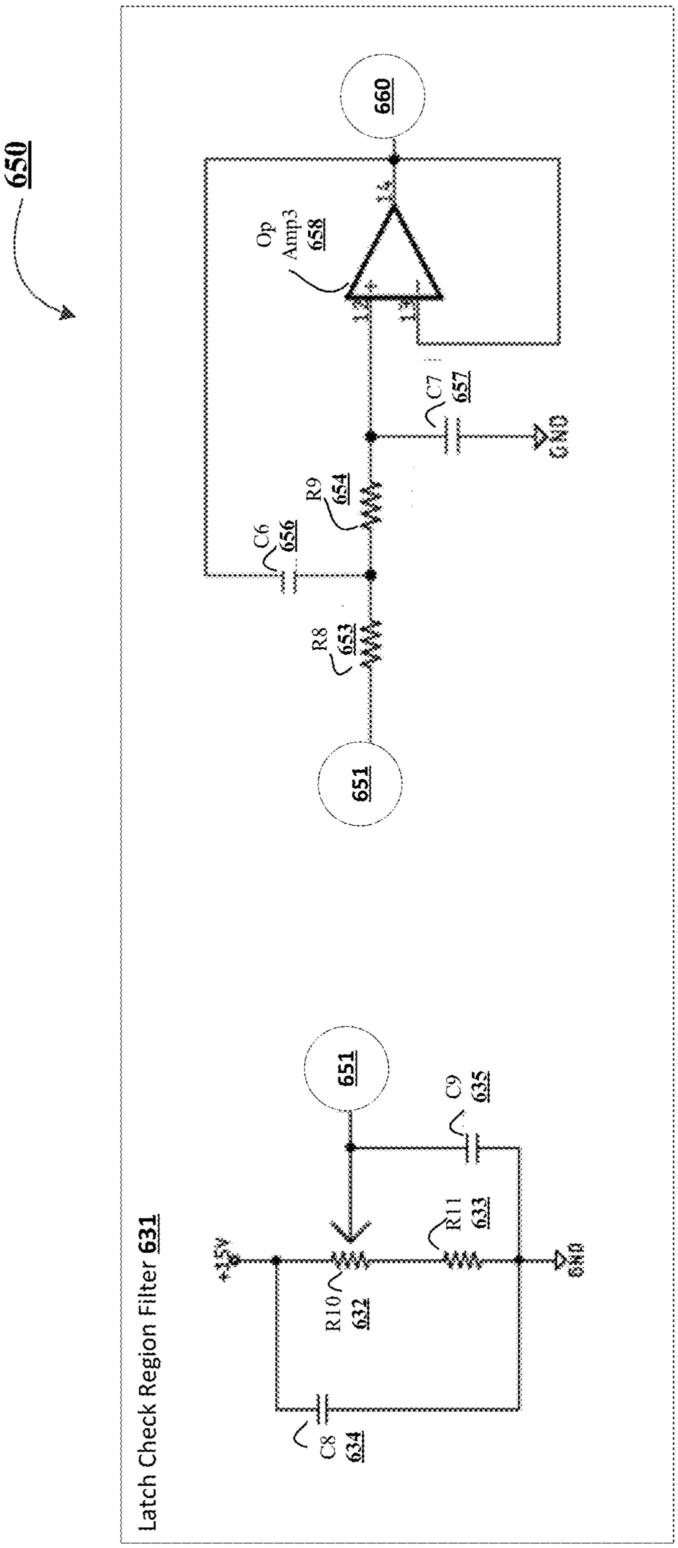
Figure 7A:
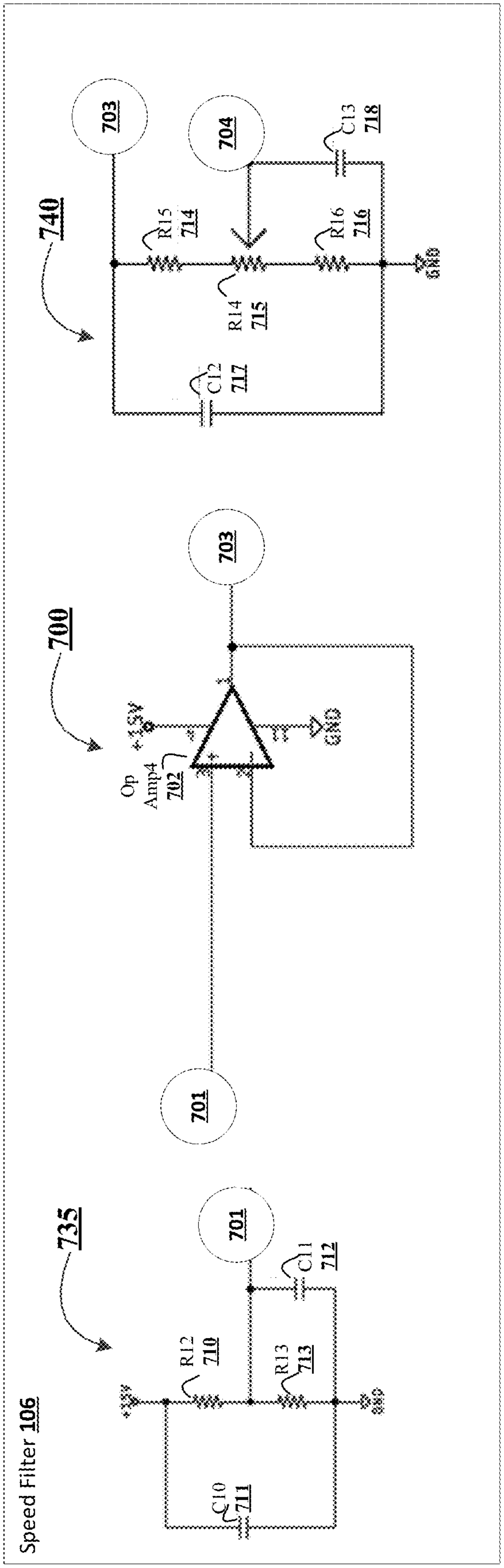
Figure 7B:
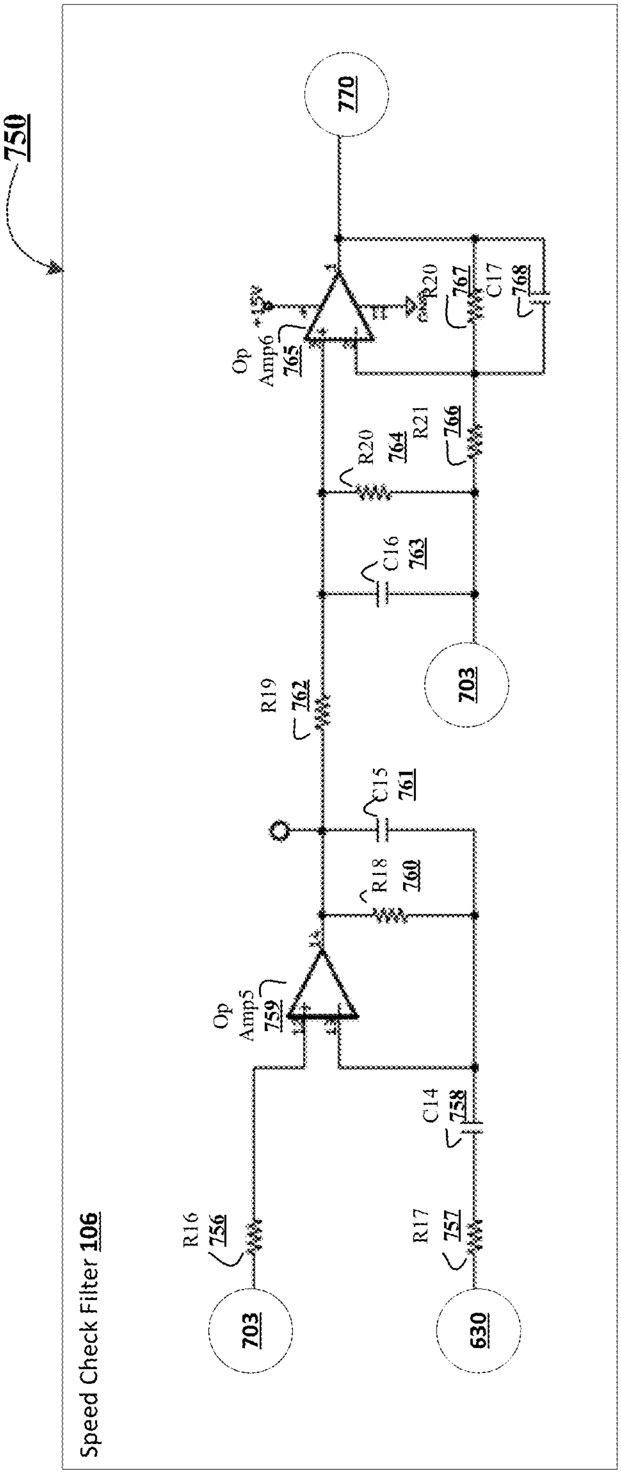
Figure 8:
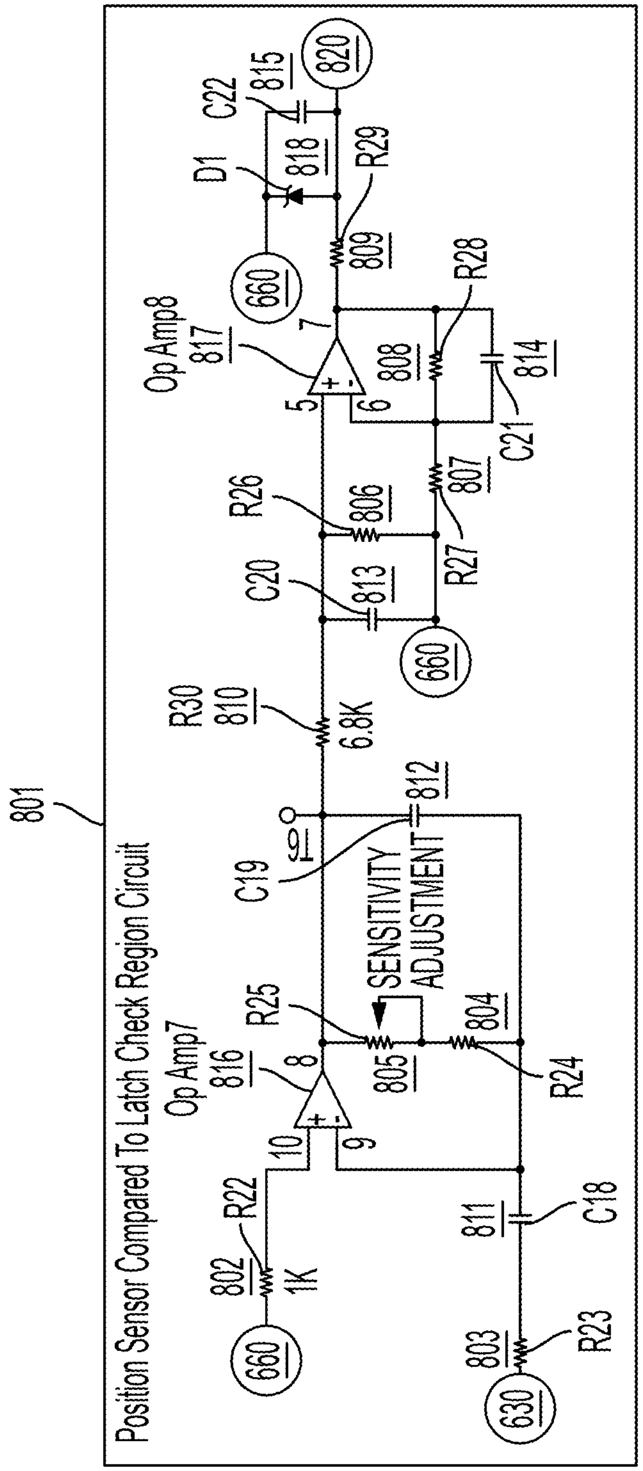
Figure 9A:
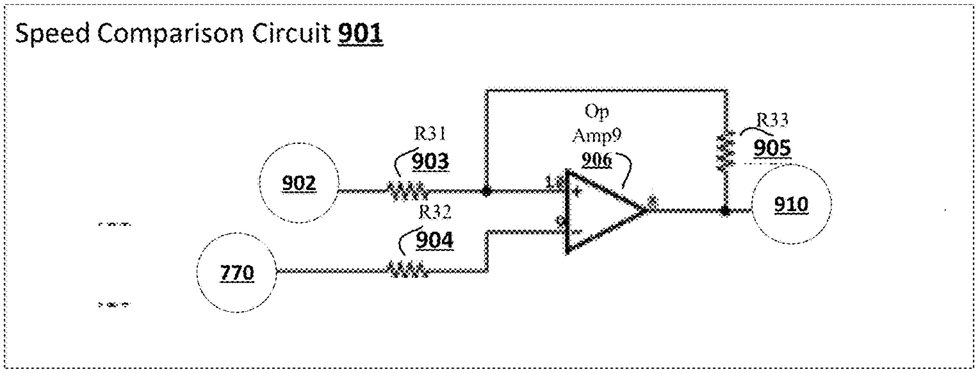
Figure 9B:
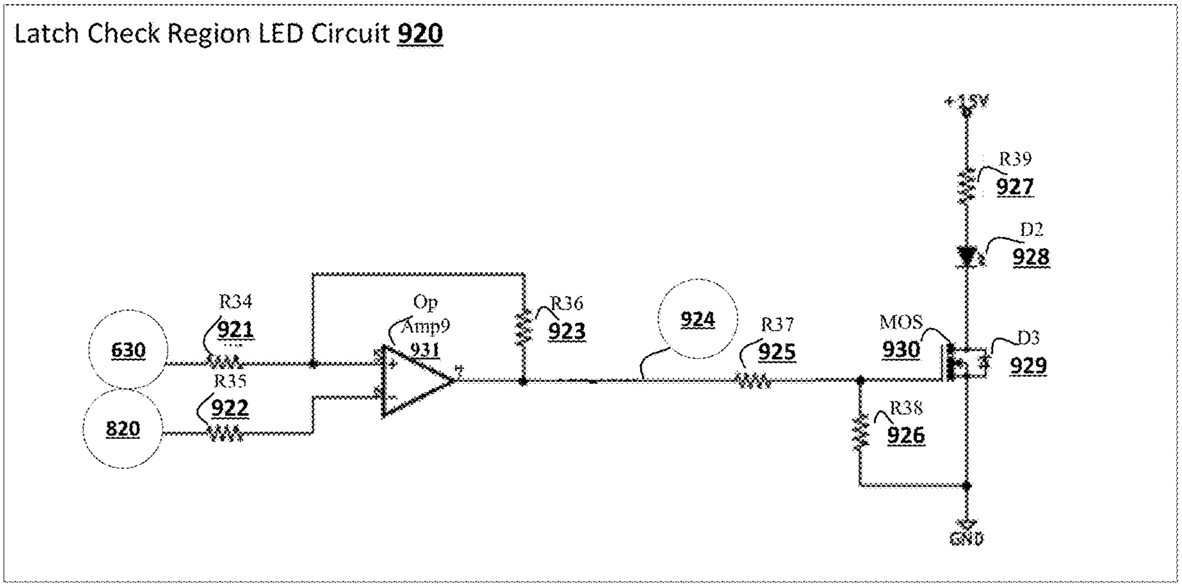
Figure 9C:
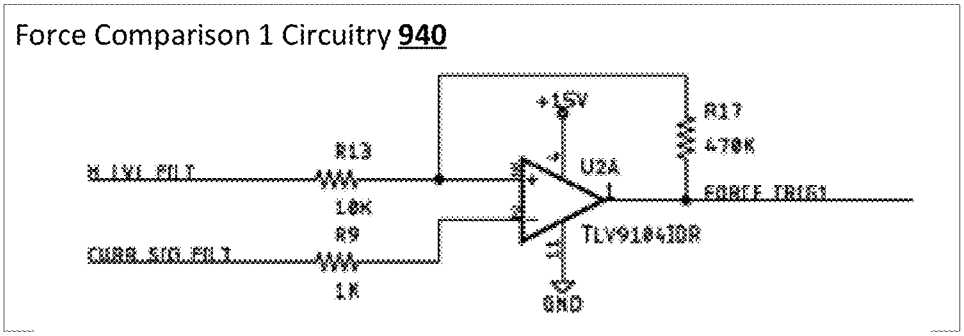
Figure 9D:
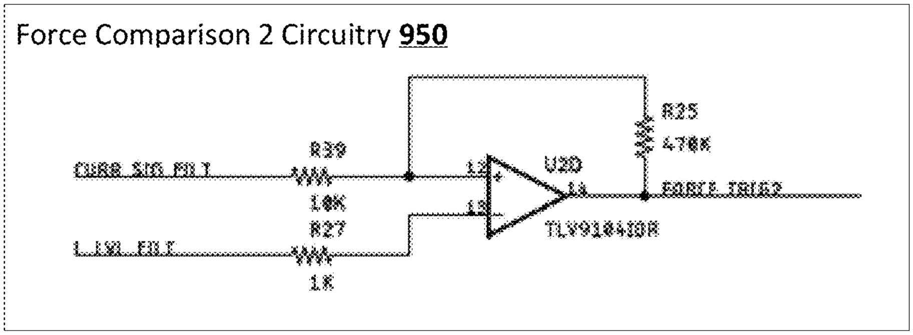
Figure 10:
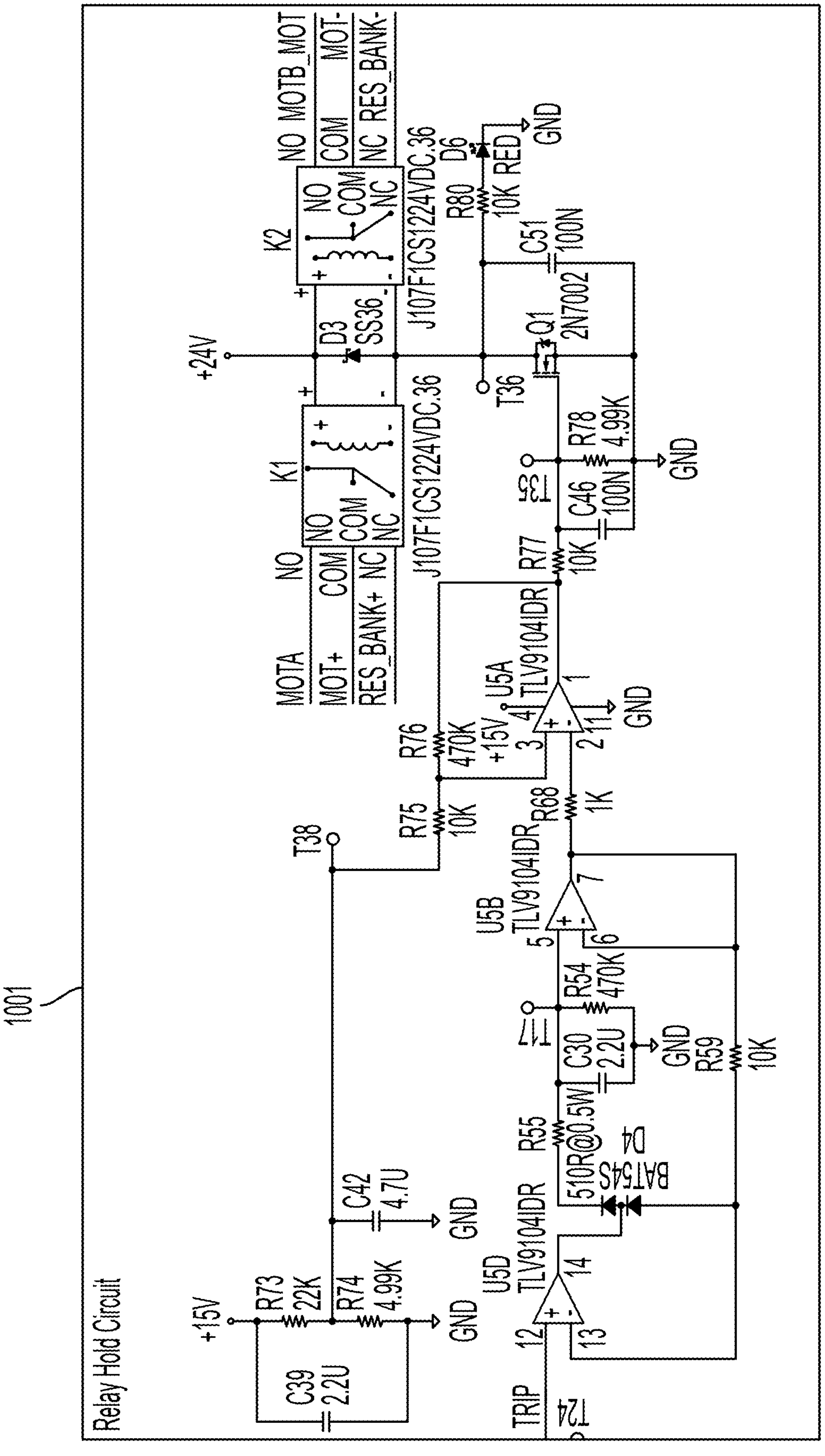
Figure 11:
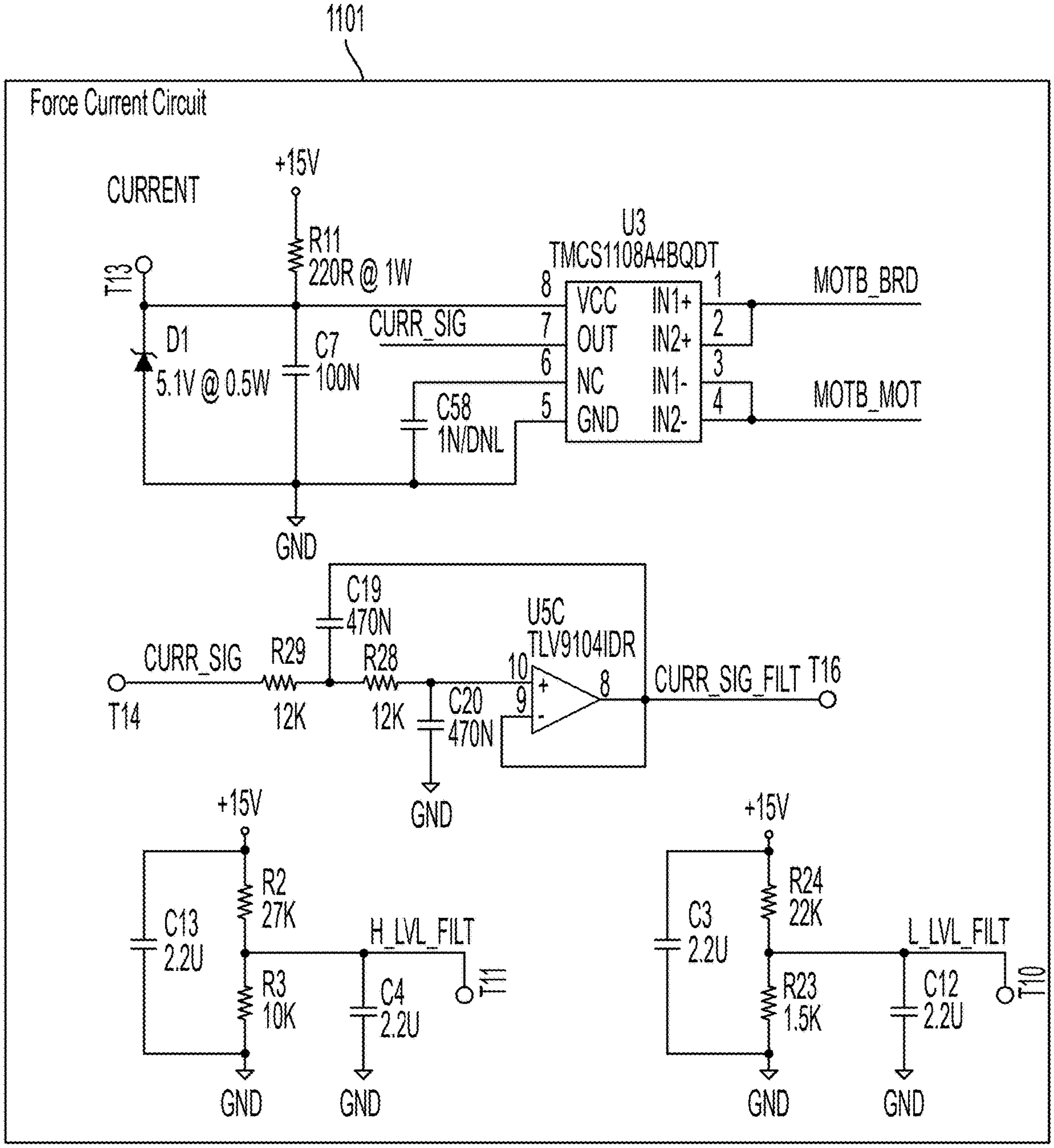
Figure 12:
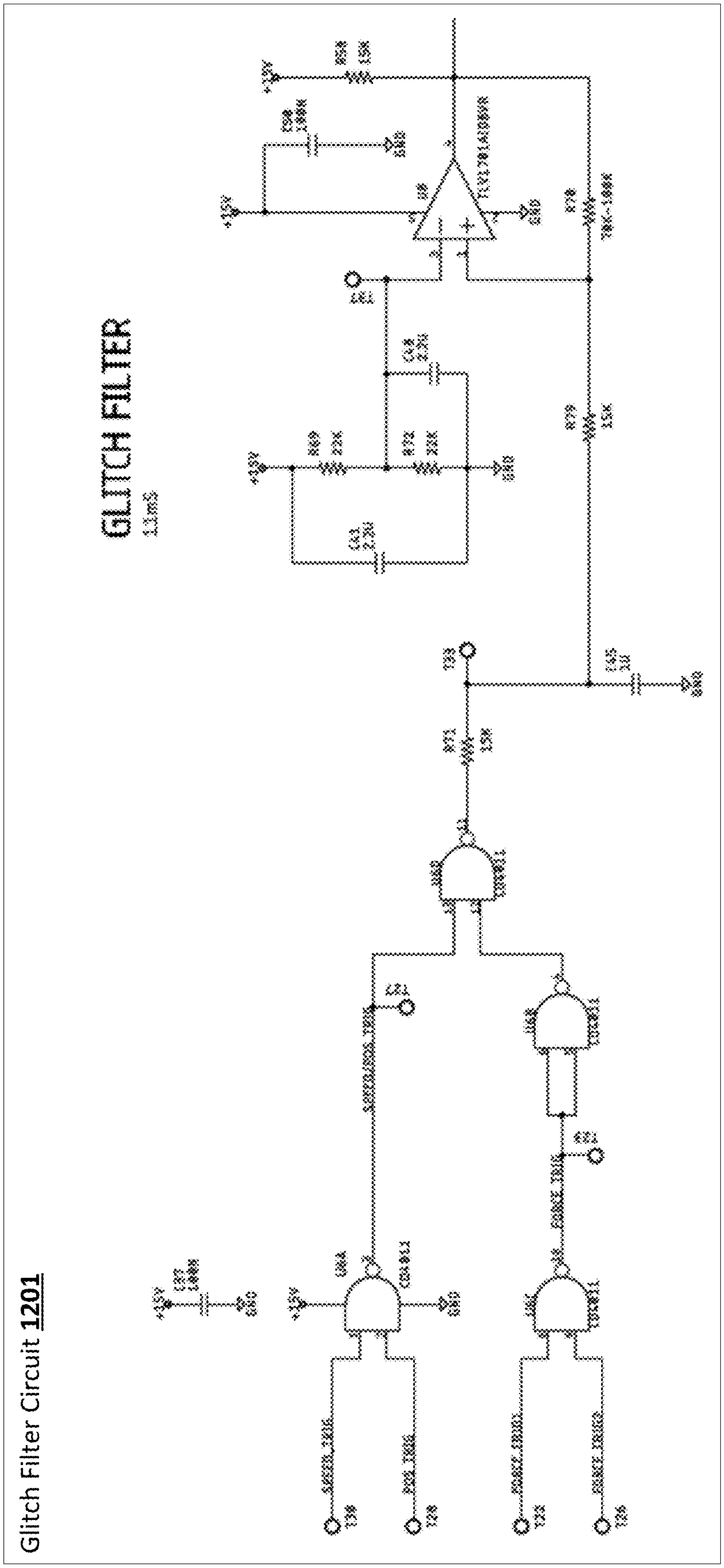
Figure 13:
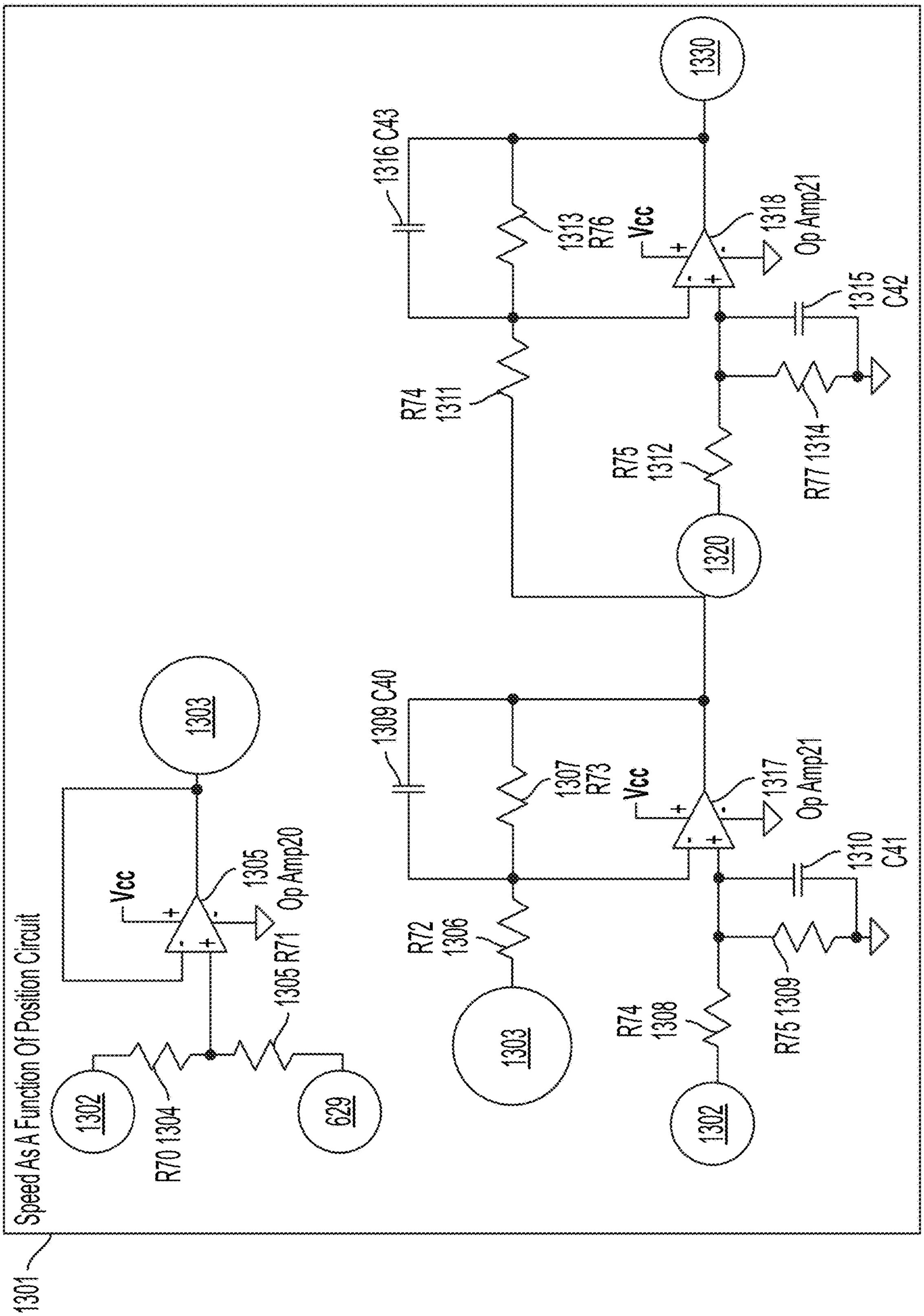
Figure 14:
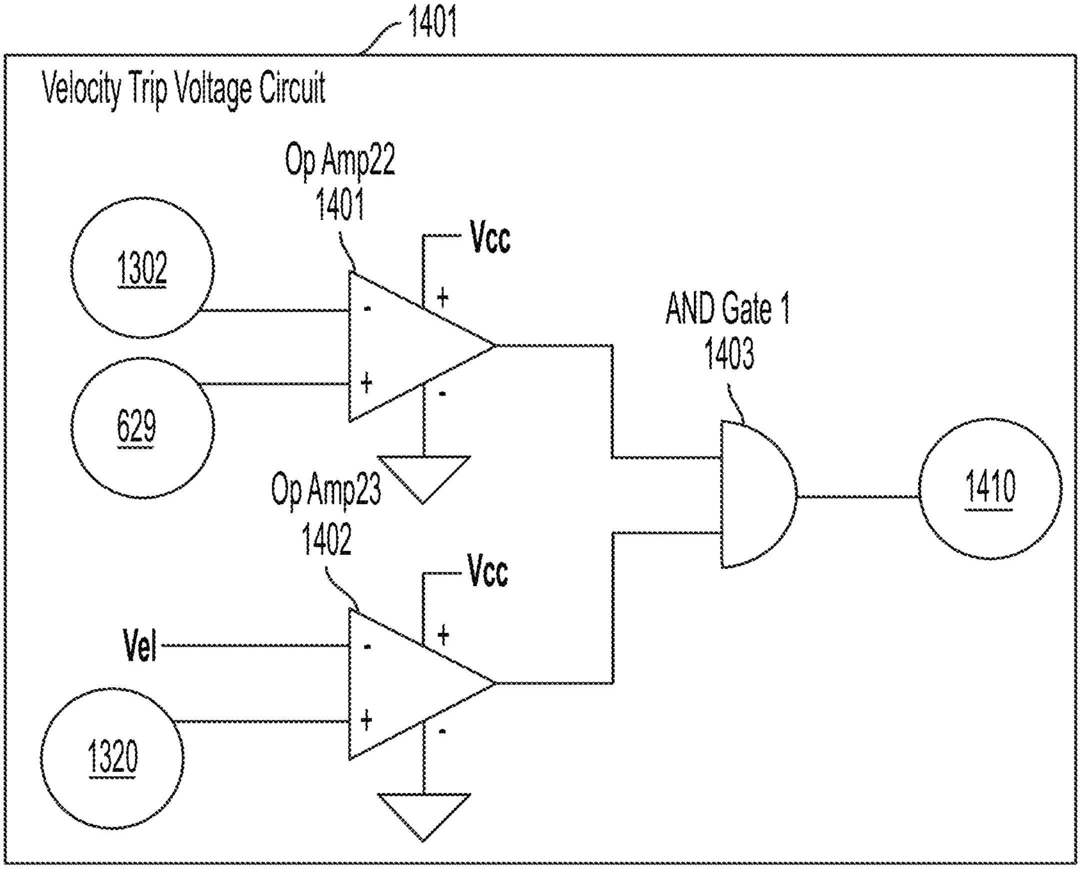
Figure 15:
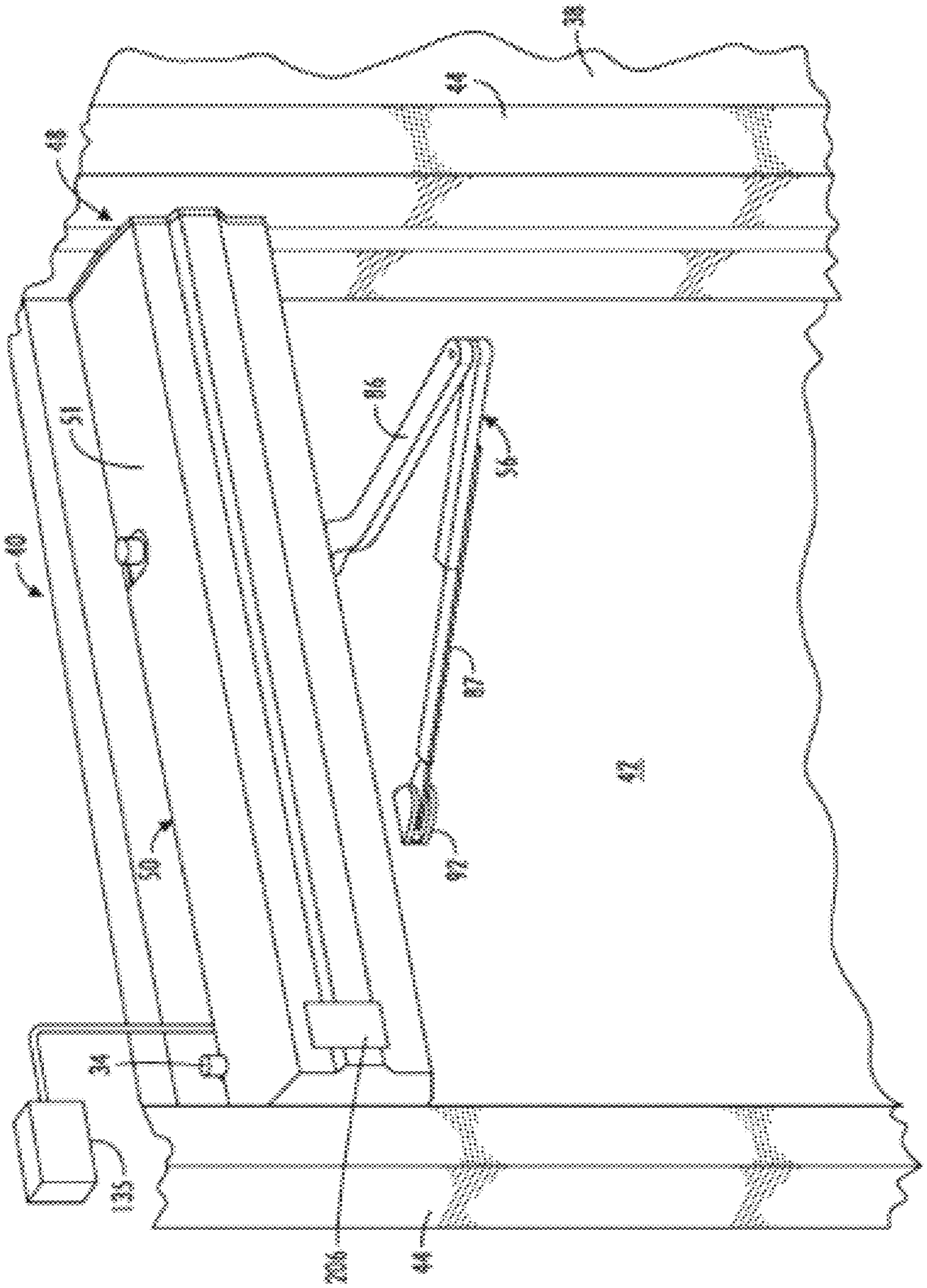
Figure 16:
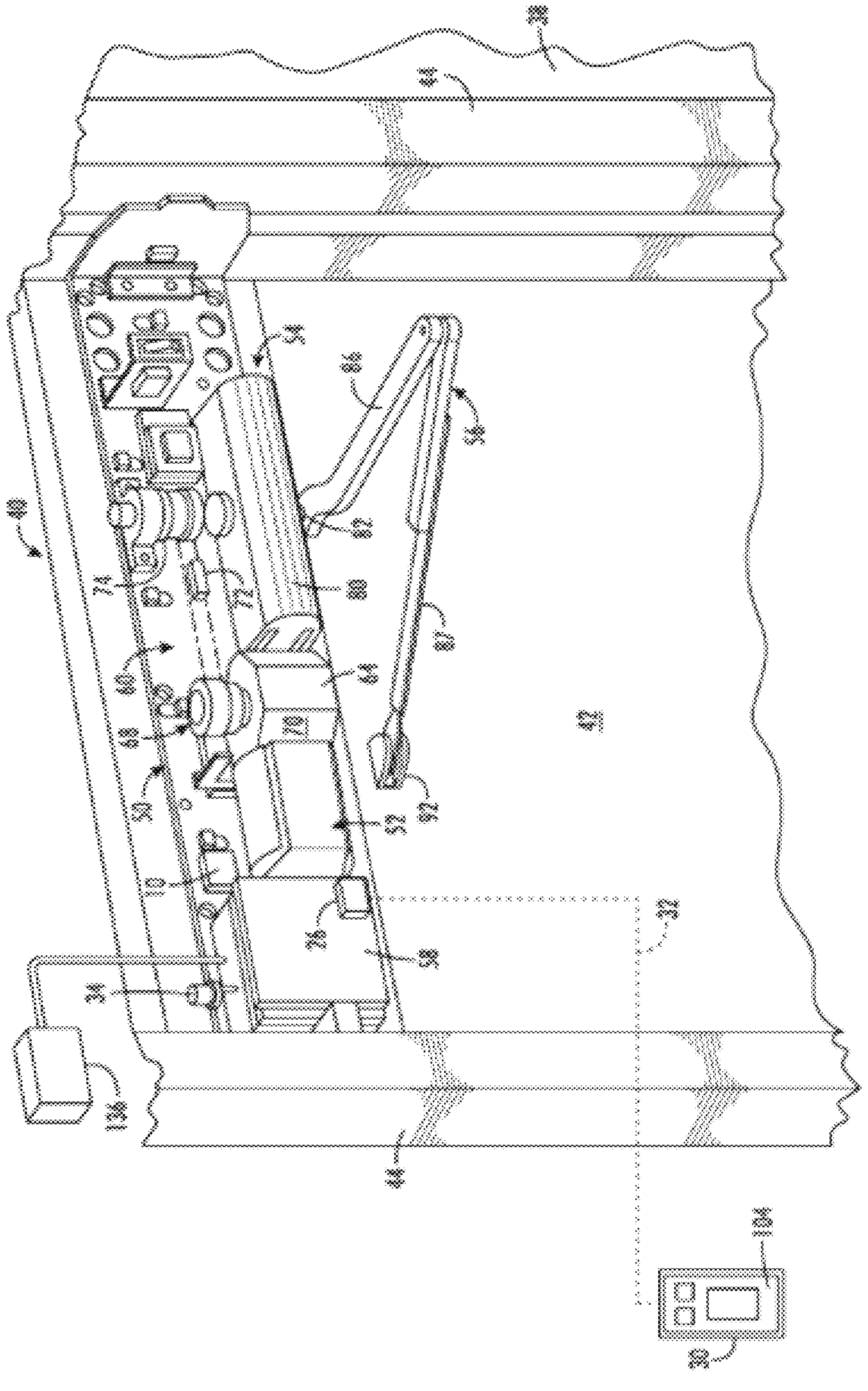
Figure 17:
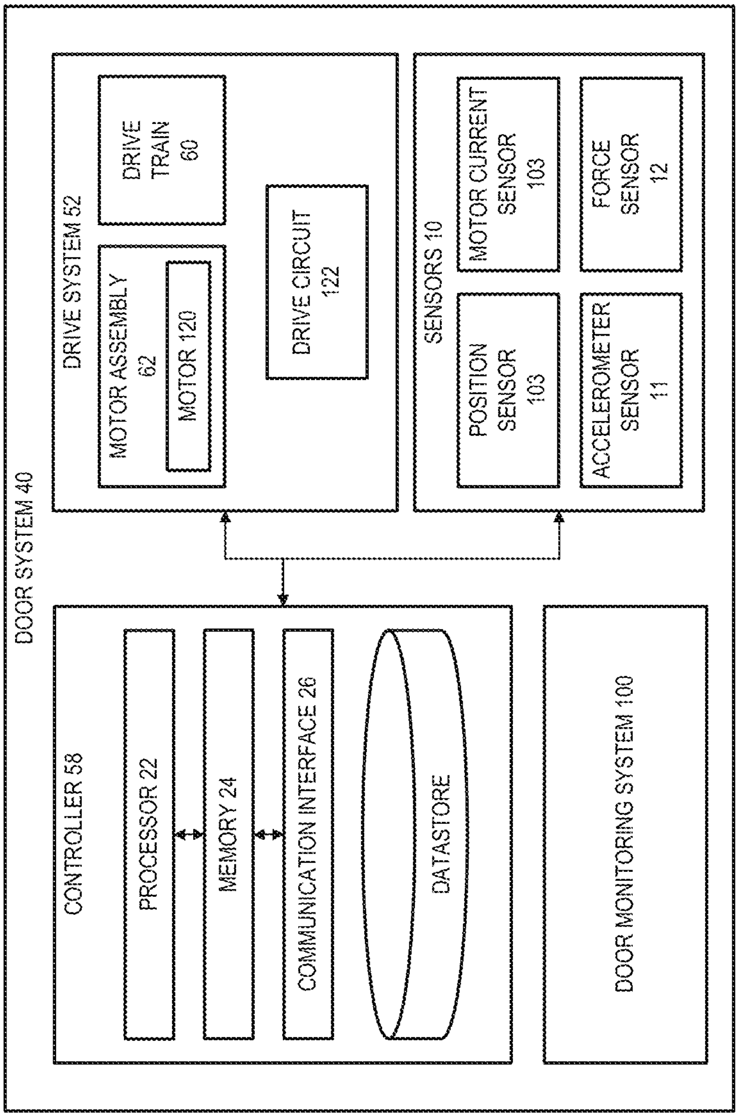

FIGS. 1A-1E illustrates technical components of an exemplary door monitoring system, in accordance with embodiments of the disclosure;

FIG. 1F illustrates an example method performed by the system of FIG. 1D, in accordance with embodiments of the disclosure;

FIG. 2 illustrates an exemplary process flow for implementing a door monitoring system, in accordance with embodiments of the disclosure;

FIG. 3 illustrates an exemplary process flow for determining whether the door will exceed a predetermined safety parameter and/or for controlling the door to bring the door to a safe condition, in accordance with embodiments of the disclosure;

FIG. 4 illustrates an exemplary process flow for determining whether the motor current for the motor of the door exceeds a pre-determined motor current, in accordance with embodiments of the disclosure;

FIG. 5 illustrates an exemplary process flow for engaging a relay to disconnect the drive circuit controlling the door and connecting the at least one braking resistor for the door to the motor controlling the door for a delay period, in accordance with embodiments of the disclosure;

FIGS. 6A-6B illustrates technical components of an exemplary position filter circuit and an exemplary latch check region filter circuit, respectively, in accordance with embodiments of the disclosure;

FIGS. 7A-7B illustrates technical components of an exemplary speed filter circuit and an exemplary speed check filter, respectively, in accordance with embodiments of the disclosure;

FIG. 8 illustrates technical components for determining the anticipation limit signal by combining speed and latch check position of the door, in accordance with embodiments of the disclosure;

FIGS. 9A-9D illustrates technical components of an exemplary Speed Comparison Circuit, a Latch Check Region LED circuit, a Force Comparison 1 Circuitry, and a Force Comparison 2 Circuitry, respectively, in accordance with embodiments of the disclosure;

FIG. 10 illustrates technical components of an exemplary Relay Hold Circuit, in accordance with embodiments of the disclosure;

FIG. 11 illustrates technical components of an exemplary Force Current Circuit, in accordance with embodiments of the disclosure;

FIG. 12 illustrates technical components of an exemplary Glitch Filter Circuit, in accordance with embodiments of the disclosure;

FIGS. 13-14 illustrates technical components of a Speed Limit Signal as a Function of Position Circuit and a velocity trip voltage circuit, respectively, in accordance with embodiments of the disclosure;

FIG. 15 illustrates a perspective view of the door system, in accordance with embodiments of the disclosure;

FIG. 16 illustrates a perspective view of the door system with the housing removed, in accordance with embodiments of the disclosure; and FIG. 17 illustrates a block diagram of the controller and door system, in accordance with embodiments of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

It should also be understood that "operatively coupled," as used herein, means that the components may be formed integrally with each other, or may be formed separately and coupled together (e.g., via wired connections). Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Embodiments of the invention related generally to door systems 40, and in particular, door monitoring systems 100 for monitoring the position, speed, and/or force with which a door 102 is moving. The door monitoring systems 100 may be an analog circuit that is used to control the door systems 40 directly, or to bypass a digital controller 58 for the door systems 40, as will be described further detail herein. The door monitoring systems 100 and/or components thereof, will be described in detail with respect to FIGS. 1A-14; however, in order to provide information regarding the use of the door monitoring systems 100 on a door system 40, the door system 40 will be described in view of FIGS. 15-17.

It is understood that a door system 40 (e.g., door operator, door closer, or the like) as described herein can be any system that controls (e.g., moves, aids in moving, or the like) a door or other barrier to an entry, an exit, a window or the like. The door system 40 may control a barrier that, for example, swings, slides, or rolls between the open and closed positions. For convenience only, the barrier will be referred to herein as a door 102 and the device will be referred to as a door system 40 (e.g., door operator, door closer, or the like); however, the invention applies to, and can be used with, other types of barriers and the use of the terms "door" and "door system", including the use of "door operator" and "door closer" are not meant to be limiting. The components of the door system 40 will be described in further detail with respect to FIGS. 15-17; however, generally, the door system 40 is mounted adjacent to, and is operatively connected to, a door 102 in a door frame 44. The door 102 moves relative to the frame 44 between a closed position and one or more open positions. For the purpose of this description, only the upper portion of the door 102 and the door frame 44 are shown in FIGS. 15 and 16. The illustrated door 102 is of a conventional type and is pivotally mounted to the frame 44 at hinges for swinging movement between the closed position and one or more open positions.

The door system 40 may comprise a casing 48, otherwise described as a housing, that includes a back plate 50 and a cover 51. A drive system 52 (e.g., comprising a drive train 60 and a motor assembly 62), a closer assembly 54, and/or a controller 58 are mounted in the casing 48 (or at least partially within the casing 48). A linkage assembly 56 operably couples the door system 40 to the door 102. The casing 48 is shown mounted to the door frame 44, however, in other embodiments the casing 48 may be mounted to the door 42, and the linkage assembly 56 operatively couples the door system 40 to the door frame 44. The casing 48 is typically mounted in a particular orientation, such as horizontally, with respect to the door frame 44. The cover 51 attaches to the back plate 50 and surrounds and encloses the components of the door system 40 to reduce dirt and dust contamination, and to provide a more aesthetically pleasing appearance. It is understood that door system 40 may also be concealed within the door 42, the wall 38 (e.g., above the door frame 44), or the door frame 44, or it may be installed in the floor.

The motor assembly 62 may include a motor 120 (e.g., a reversible electric motor, unidirectional motor, or the like). The motor 120 may include a motor drive shaft 68. The drive train 60 may include a drive gear 70 connected to drive shaft 68, a driven gear 74 connected to output shaft 82 (e.g., directly or through a chain 72 connecting the drive gear 70 to the driven gear 74). Alternatively, other types of drive trains 60, such as only gears (e.g., no chains), alternatives to chains (e.g., bands, ribbons, or the like), cam and follower, screw mechanism, mechanical linkages, or any type of drive train 60 may be used with a motor assembly 62, or other mechanical, electromechanical, hydraulic, pneumatic, or the like device to open or close the door 42. In some embodiments, operation of the motor 120 rotates the output shaft 82 to drive the linkage assembly 56 to open and/or close the door 42 or to assist in the opening and/or closing of the door 42.

To close the door 42, a closer assembly 54 may be provided for returning the door 42 to the closed position after the door 42 has been opened. The closer assembly 54 may include a closer 80 of standard construction which provides a closing force on the door 42 when the door 42 is in an open position. The closer 80 may comprise a spring system, hydraulic system, pneumatic system, and/or other systems, or combinations of such systems, for providing the closing force. In other embodiments, the closing force may be supplied by the motor 120 that is used to open the door 42 or by a second motor (e.g., a closing motor).

The linkage assembly 56 is shown comprising a first rigid connecting arm link 86 and a second rigid connecting arm link 87. The first connecting arm link 86 is fixed at one end to the lower end of output shaft 82 such that the first connecting arm link 86 is rotated by the output shaft 82. The second end of the first connecting arm link 86 is pivotally connected to a first end of the second connecting arm link 87. The second end of the second connecting arm link 87 is pivotally joined to a door 42 directly or through a mounting bracket 92 fixed to the door 42. While a rigid two-arm linkage assembly 56 is shown, the linkage assembly 56 may be different than that illustrated and may include a greater or fewer number of arm linkages, sliding elements, shock absorbing arms, mounting brackets 92, or the like.

While a specific embodiment of a door system 40 is shown, the door system 40 may comprise any suitable mechanisms and may use mechanisms other than, or in addition to, the illustrated components, and thus, is not limited to the embodiment shown in FIGS. 15 and 16 or the specific orientation and/or placement of the illustrated components. For example, the drive system 52 may include hydraulic, pneumatic, electrohydraulic, or electromechanical systems. The drive train 60 may comprise a gear train rather than the chain drive 72. A single reversible motor 120 may be used to provide both the opening and closing forces. Moreover, multiple motors 120 may be used where, for example, one motor opens the door 102 and a second motor closes the door 102.

The door system 40 may be operated by a controller 58. The controller 58 (e.g., a digital controller) is in electrical communication with the drive system 52 (e.g., the motor assembly 62, or the like). The controller 58, which will be described in further detail with respect to FIG. 17, controls the operation of the motor 120 (and/or other components of the door system 40) and functions to transmit appropriate control signals to the drive system 52 for actuating the motor 120 and the drive train 60. The controller 58 operates to control the drive system 52 in accordance with operating parameters (e.g., speed, force, acceleration, time, or the like) stored in the door system 40 or remotely from other remote computer systems over a network. By way of example, the controller 58 may control the drive system 52 to maintain the door 102 in an open position for a selected period of time in order to allow sufficient time for a person to pass through the door opening. The controller 58 may also control the speed of the motor 120 for controlling the speed of opening or closing the door 102. Other operating parameters for controlling the operation of the door system 40 will be described in further detail herein later. It is to be understood that although the controller 58 is shown mounted in the casing 48, the controller 58 could also be housed separately from the door system 40 such as within the wall 38, a ceiling, in or on the door itself, in or on the floor, or remotely, such as in a mechanical room, for example.

As will be described in detail with respect to FIGS. 1A through 14, the door monitoring system 100 will be used to monitor a door system 40 and/or bypass the controller 58 of the door system 40 in the event the door system 40 is not operating properly (e.g., within threshold operating parameters). For example, if the software of the controller 58 has a software bug and/or should a mechanical component of the door system 40 not be operating properly, the door monitoring system 100 may be used to alter the operation of the door system 40 to account for such errors.

Generally, the door monitoring system 100 may be utilize sensors 10 (e.g., position sensor 103, accelerometer sensor 11, force sensor 12, or other like sensors). While different types of sensors 10 may be utilized in order to determine the movement of the door 102 (e.g., position, speed, acceleration, or the like), the door monitoring system 100 is generally described here as using a position sensor 103 in order to determine if the door system 40 is operating within the allowable operating parameters (e.g., speed, force, acceleration, generally or at a particular location of the door 102). In some embodiments, if or when the door system 40 is operating outside of an operating parameter (e.g., operating threshold), the door monitoring system 100 may disconnect the motor 102 from being operated by the controller 58, and activate the braking system 101, which will be described herein, in order slow the movement of the door 102 (e.g., reduce the closing speed or stop the door 102).

As such, the door monitoring system 100 may include a signal processing device using and generating multiple signals to accomplish the goal of monitoring the door system 40 to ensure that the controller 58 is staying withing allowable operating parameters. Should the speed or the force of the door 102 exceed the operating parameters of the door system 40 then the door monitoring system 100 engages the braking system 101.

As will be described in further detail herein, the door monitoring system 100 may use a motor current sensor 121 and a position sensor 103 to determine the speed of the door 102. For example, a motor current reading from the motor current sensor 121 is scaled to be proportional to the force that the door system 40 is exerting on a door 102. The position sensor 103 is used to monitor latch-check speed. The position sensor's signal (e.g., appropriately scaled and filtered) is used to determine if the door 102 is in the latch-check region or not. Moreover, a bandwidth limited derivate of the output of the position sensor 103 is used to obtain a speed signal. Additionally, the door monitoring system 100 may use one of two methods to anticipate the need for engaging the braking system 101. That is, the first method may use the door's speed to modify the latch-check region signal such that the speed of the door is scaled to create a latch-check region that extends the faster the door is moving (e.g., increases the latch-check region). The second method may use the door position and adds it to the maximum speed, which results in a max speed that increases the further away the door is from latch-check position.

The signals of the door monitoring system 100 are used to determine if the door 102 is exceeding the allowable speed in the latch-check region and/or if the door is moving too fast to be able to meet the speed requirements before entering the latch-check region. Consequently, the door monitoring system 100 has the ability to "anticipate" the need to brake before the actual latch-check region is reached.

Door Monitoring System with a Braking System

Turning to the figures for describing the invention in further detail, FIGS. 1A-1C illustrate technical components of a door monitoring system 100 and its associated inputs and outputs, in accordance with an embodiment of the disclosure. As shown in FIG. 1A, the door monitoring system 100 may utilize a door braking system 101 having a position filter 104, a speed filter 106, an anticipation circuit 108, current sensor 121, a relay 110, and at least one braking resistor(s) 112. Further, the door braking system 101 may be coupled with other technical components, such as a power supply 150, a door 102 which may be operatively coupled to a drive circuit 122 and position sensor 103, and a motor 120. FIG. 1A illustrates only one example of the components and their configurations within and outside of the door braking system 101 withing the door monitoring system 100. However, and as understood by a person of skill in the art, the door monitoring system 100 and the door braking system 101 thereof, described herein may itself comprise each of the components described herein, may comprise only certain components described herein, and/or may operate components housed outside of these systems.

As described herein, the door braking system 101 of the door monitoring system 100 may operate by receiving a position signal from a position sensor 103 operatively coupled to a door 102 (e.g., located on a door 102, adjacent a door 102, or the like), whereby the position signal may comprise an analog signal which may be transmitted via a connection from the position sensor 103 to the position filter 104 within the door braking system 101. Upon receiving the position signal from the position sensor 103, the position filter 104 may comprise a circuit configured to filter the position signal(s) such that a real-time portion of the position signal is considered. Such an exemplary position filter 104 may be described in further detail below with respect to FIG. 6A.

In some embodiments, a position filter may be placed in series with the position sensor, where such use of a position filter may improve the performance of the overall door monitoring system by filtering and conditioning the position signal(s). The position filter, upon receiving the position signal(s), may filter and clean the position signal, such as by cleaning noise from the position signal(s), differentiating the position signal(s), and/or the like. Once the position signal (s) have been filtered by the position filter 104, the door braking system 101 may output the filtered position signal(s) to at least one of a speed filter 106 and/or an anticipation circuit 108. Such a speed filter 106 may determine a current speed of the door, such as when the door is getting closer to a latch check region, whereby the latch check region comprises a region of positions for the door surrounding the latch position of the door (i.e., when the door closes). In some embodiments, the latch check region may change based on the weight and/or size of the door 102.

The speed filter may be configured to differentiate the position signal(s) and perform a second differentiation of the differentiated position signal(s) to determine the speed, by inputting the position signal(s) to a circuit, such as a circuit described with respect to FIGS. 6A-6B.

Upon generating the speed of the door, the door braking system 101 may use the current speed of the door and the position signal(s) from the position filter 104 as inputs to determine when to engage the braking system. Additionally, the anticipation circuit 108 may generate an anticipated position of the door at a future period based on both the generated speed of the door 102 and the received position signal(s). Further, and based on the anticipated position of the door, the door braking system 101 (e.g., through the anticipation circuit 108) may determine an anticipated speed of the door 102 at the anticipated position. Such an anticipated position may be generated based on a linear model, such as through a linear model configured to determine a current position of the door (e.g., as a degree position as compared to the latch check region or latch check position, for example, the current position may comprise a degree position of 40 degrees, such as 40 degrees per second which is compared against a plurality of positions for the latch check region). Upon determining the current position of the door, the door braking system 101 may generate a speed of the door based on the linear model (e.g., which may comprise an adjustable proportion of the generated speed signal from the speed filter 106, whereby the adjustable proportion may be changed based on a change to the linear model). By way of non-limiting example, the adjustable proportion may comprise a half proportion of the current speed, such that the adjustable proportion can be 20 degrees for a 40 degrees per second speed, which may indicate the future position to be a linear position based on a linear speed (e.g., 60 degrees at a next second, 80 degrees at a next second, and/or the like). Further, and in some embodiments, the anticipation circuit 108 may use a current sensor 121 to receive current sensor data from the drive circuit 122 controlling the motor 120 of the door and controlling the mechanisms within the door (e.g., brakes, braking resistors, and/or the like). Such current sensor data may be compared with the anticipated speed of the door to determine whether to activate the braking resistor(s) 112 via the relay 110.

In the instance where the current from the drive circuit 122 exceeds (and/or meets) an allowed current (e.g., maximum current, other set current, or the like) pre-determined for the door 102 or where the anticipated speed exceeds (and/or meets) an allowed speed (e.g., maximum speed, other set speed, or the like), the door braking system 101 may be configured with a relay 110 to disconnect the drive circuit 122 from the motor 120 and connect the braking resistor(s) 112 to the motor 120. Thus, and by way of the braking resistor(s) 112, the door braking system 101 may use the at least one braking resistor(s) 112 and/or a plurality of braking resistors 112 (e.g., in a brake resistor bank) to connect (via the relay 110) to the motor 120 associated with the door 102, which may be combined with the motor 120 to create a dynamic braking system designed to slow down the speed of the door 102.

Additionally, and as understood by a person of skill in the art, the door braking system 101 may be connected to a power supply 150, which may be connected to the drive circuit 122 and/or the door braking system 101. In some embodiments, the drive circuit 122 may be connected to its own, individual power supply. In some embodiments, the drive circuit 122 may be connected to the door braking system 101, individually. In some embodiments, the power supply 150 may comprise a wired or battery power supply, as such the power supply 150 may be a DC power supply, an AC to DC power supply, and/or other like power supply. In some embodiments, the DC power supply and/or AC to DC power supply may comprise a 24 V DC power supply, and/or the like.

Additionally, an anticipation circuit 108 may be configured to analyze the current from the drive circuit 122 controlling the door 102, where a current sensor 121 may input the real time current for the drive circuit 122 to the anticipation circuit 108 for comparison against a pre-determined allowable current (e.g., maximum allowed current, or the like). For instance, such a current may be associated with the current controlling the motor 120 of the door 102, and the anticipation circuit 108 may be designed to consider the current of the motor 120 in real-time, against a pre-determined motor current to determine whether to disconnect the drive circuit 122 from the motor 120 via the relay 110. In the instance where the real-time current of the motor 120 exceeds (or meets) the pre-determined motor current, the door braking system 101 may engage the relay 110 to disconnect the drive circuit 122 from the motor 120 and connect the braking resistor(s) 112 (e.g., a single resistor and/or a bank of resistors) to the motor 120.

As shown in FIG. 1B, the anticipation circuit 108 and its summarized logic are shown, along with each of the inputs and outputs considered for the anticipation circuit 108, in a system environment 140. For instance, the anticipation circuit 108 may include a component configured to determine whether the door's current position is outside of the latch check region 232 (i.e., is in the pre-latch check region), a component configured to determine whether the speed of the door is greater than the latch check region speed 234, an AND gate 236, an OR gate 238, and a relay 110. Additionally, and as shown herein, the anticipation circuit 108 may be operatively coupled and/or connected to various other components within and around the door monitoring system 100, such as but not limited to the position filter 104, the speed filter 106, the motor 120, the braking resistor(s) 112, the drive circuit 122, and/or the current sensor 121. In some embodiments, and as understood by a person of skill in the art, the anticipation circuit 108 may be configured to comprise, house, and/or operate all of the components listed herein, and/or may be configured to comprise, house, and/or operate only a portion of the component listed herein. The configuration of components within and around the anticipation circuit 108 is meant to describe just one embodiment of the anticipation circuit and should not be considered to limit all the possible configurations herein described and/or herein understood.

For instance, and based on the configuration shown in FIG. 1B, the anticipation circuit 108 may be configured to receive the signal from the position filter 104, determine a current position of the door 102 and whether the current position is outside of the latch check region (e.g., which may be pre-determined based on the size and/or weight of the door 102). Additionally, and in some embodiments, the anticipation circuit 108, may receive (e.g., from the speed filter 106) a speed signal and determine whether the current speed of the door 102 is greater than the latch check region speed (e.g., outside of operating parameters for the door 102), and where the position is greater than the latch check region—and by inputting the latch check region determination outside the latch check region into an inverter like inverter 230—the anticipation circuit may determine whether the door is actually within the latch check region or not. Based on both of these determinations and based on both the speed signal and the position signal, the anticipation circuit 108, may determine whether both of these instances are true (e.g., such that the indication where each instance is true generates an analog amplitude value of a high value—such as a value of 1 or close to 1, or when at least one of the instances is false generate an analog amplitude value of a low value—such as a value of 0 or close to 0) and may input both to the AND gate 236 to determine whether the requirement of the position is greater than the latch check region and the speed is greater than the allowable speed at the latch check region, the anticipation circuit 108 (via the AND gate 236) will return a high amplitude value for the analog signal. However, and where at least one of the instances is false, the AND gate 236 will return a low analog signal amplitude. Based on these inputs, the AND gate may take each of the inputs and determine whether both instances are true (both return a high amplitude value).

Additionally, and as shown in FIG. 1B, the anticipation circuit 108 may be configured with an OR gate 238 to determine whether the real-time motor current is greater than and/or meets an allowable motor current OR whether both instances described above are true (e.g., the speed of the door is greater than the allowable speed and the position is not within the latch check region). Where at least one of the instances is true (e.g., where the output of one of the instances is close to 1 from the current sensor 121 or the AND gate 236), the anticipation circuit 108—based on the output of the OR gate—may cause the relay 110 to disconnect the current from the drive circuit 122 to the motor 120 and connect the motor 120 to the braking resistor(s) 112.

In some embodiments, and as disclosed herein, the AND gate 236 and the OR gate 238 may operate by using analog signals from each of the position filter 104, the speed filter 106, and/or the current sensor 121, by implementing at least one operational amplifier to differentiate the input signals from each component to determine whether each instance is true or false. Such circuit designs and their use of operational amplifiers are described in further detail below.

As shown in FIG. 1C, the relay 110 and its associated input terminals and inputs are shown, along with each of the outputs in a system environment 150. For instance, the relay 110 may comprise an input from the OR gate 238 (described hereinabove), a current sensor 121, and a motor 120. Additionally, the relay 110 may also comprise input terminals of a normally closed (shown as "NC") 320 terminal, a normally open (shown as "NO") 318 terminal, a coil 340, and a continuously connected node 330. Thus, and as shown with respect to relay 110 of FIG. 1C, the relay 110 may be configured to open and/or close the connection between the motor 120 and the current sensor 121 or the braking resistor (s) 112, depending on the input received at the coil 340 from the OR gate 238. Thus, and when the OR gate comprises an indication (e.g., an amplitude of a value close to 1 and/or a certain signal level when the data is transmitted in analog) that the current of the motor 120 is greater than an allowable speed and/or where the speed of the door 102 is greater than or equal to the allowable speed and the position is greater than the latch check position, then the relay 110 may be engaged based on the coil's input signal to connect and/or disconnect the current from the drive circuit 122 or the braking resistors 112.

In some embodiments, the relay 110 may comprise a normally closed (NC 320) terminal connection to the braking resistor(s) 112 and may comprise a normally open (NO 318 terminal of FIG. 1C) terminal connection to the drive circuit 122 (e.g., connected to current sensor 121). In some other embodiments, the relay 110 may comprise a normally closed (NC 320) terminal to the drive circuit 122 and a normally open (NO 318) terminal connection to the braking resistor(s) 112. Thus, and based on each configuration, the normally closed terminal and its connection may comprise the direct connection to the motor 120 at normal operating conditions (e.g., when the anticipated speed does not meet or exceed an allowable speed, when position is not within the latch check region, and when the current of drive circuit 112 does not meet or exceed an allowable current) and a normally closed connection to the braking resistors in order to account for power outages, glitches, and other such power failures.

In some embodiments, and as understood by a person of skill in the art, the connections to each terminal (e.g., NC 318, NO 320, node 330, and coil 340) may change based on the needs of the door braking system 101. For instance, and in some embodiments, the NC 318 terminal may be connected to the current sensor 121 and the NO 320 may be connected to the braking resistor(s) 112, such that the connection between the motor 120 and the braking resistor (s) 112 is normally closed and operational, and the connection between the current sensor 121 and the motor 120 is normally open (broken) until the relay 110 engages.

FIG. 2 illustrates a process flow 200 for implementing the door monitoring system 100 utilizing a door braking system 101, in accordance with an embodiment of the disclosure. In some embodiments, a system (e.g., similar to one or more of the systems described herein with respect to FIGS. 1A-IC and the circuits of FIGS. 6A-14) may perform one or more of the steps of process flow 200. For example, the door monitoring system 100 utilizing a door braking system 101 (e.g., the system described herein with respect to FIG. 1A-1C) may perform the steps of process 200. Such a door monitoring system like that described herein may be configured to close and/or open the door(s).

As shown in block 202, the process flow 200 may include a position sensor 103, wherein the position sensor 103 determines a position of a door 102. By way of non-limiting example, the door braking system 101 may be operatively coupled to the position sensor 103, such that the position sensor 103 is housed and operated within the door braking system 101 or housed and operated outside the door braking system 101. For instance, a position sensor 103 may be placed on the door 102 itself, which may be adjacent to and operatively coupled to the door braking system 101, or the position sensor 103 may be placed on the door 102 itself inside the housing of the door braking system 102. Alternatively, the position sensor 103 may be located adjacent the door (e.g., on the door frame 44, wall, or the like) and be able to monitor the position of the door 102. The position sensor 103 may be operatively coupled (connected) to at least one other component within the door braking system 101, such as a speed filter 106 and/or a position filter 104. In some embodiments, the position sensor 103 may generate a position signal, such as an analog signal, whereby the analog signal comprises at least one amplitude used to determine the current position of the door 102. In some embodiments, the door braking system 101 may use the position signal 103 to determine a degree of position of the door 102 as compared to the latch check position and/or latch check region (which may also be indicated as a degree or a range of degrees before the door 102 reaches the closed position). It should be understood that the latch check region may be a pre-set and/or later adjusted operating parameter of the door system 40.

In some embodiments, the position sensor 103 may be operatively coupled with the motor 120 controlling the door 102, whereby the motor 120 may be used to indicate the number of rotations of the drive shaft of the motor 120 as the door 102 is opened and closed (as the door moves away from the latch check region to its furthest degree point and as the door moves toward the latch check region). In this manner, the position sensor 103 may be configured to determine the number of rotations of the drive shaft to make a linear determination of where the door 102 is, at its current position.

In some embodiments, additionally or alternatively to the position sensor 102, other types of sensors may be used to determine the position, speed, acceleration, or the like of the operation of the door 102. For example, the one or more sensors 10 may be a speed sensor, such an accelerometer sensor 11, and/or the like, whereby the accelerometer sensor 11 is configured to determine the speed of the door 102 and a position signal may be determined based on this speed (speed signal). Such an embodiment is explained in further detail below. In some embodiments, the one or more sensors 10 may include a force sensor 12 configured to generate a signal of the force applied to the door 102 and/or a force to close or open the door 102. Similarly, and as described above, these sensors may be associated and/or operatively coupled to the door 102 and/or the door system 40, such as a drive shaft of the motor 120 (e.g. and used to determine the number of rotations over the rate of time), to determine the current speed of the door 102.

In some embodiments, a position filter 104 may be in series with the position sensor 103, whereby the position filter 104 configured to filter and condition the position signal(s). In some embodiments, the door braking system 101 may comprise a position filter 104 directly connected to the position sensor 103, such that the position signal generated by the position sensor 103 is output to the position filter 104. In some embodiments, the position filter 104 may be configured to clean any noise of the position signal, to clean the signal such that only portions of the position signal are left (e.g., at time intervals of millisecond, one second, two seconds, and/or the like and the associated peaks), to clean the signal such that only portions comprising amplitudes within a cutoff frequency are left (e.g., higher frequencies will be cleaned), and/or the like.

As shown in block 204, the process flow 200 may include a speed filter 106, the speed filter 106 configured to generate a speed signal from the position signal. In some embodiments, and based on the filtered position signal, the door braking system 101 may generate a speed signal by inputting the filtered position signal to the speed filter 106. In this manner and based on the frequency and amplitudes of the filtered position signal, the speed filter 106 may be configured to determine the speed at which the door 102 is opening and/or closing at a current time for the position signal.

In some embodiments, and in an instance where the door braking system 101—through the position filter 104—determines a degree of the door 102 at a particular instance (e.g., such as 40 degrees at one second), the door braking system 101 may use a linear model (e.g., through the design of its circuit(s) with resistors, operational amplifiers, potentiometers, capacitors, and/or the like) such that the degrees may be scaled, added, or subtracted in a linear manner. For instance, and where the degree of position for the door is 40 degrees, and where the door braking system 101 comprises, a linear model comprising half the degrees per second, the door braking system 101 may determine that the door 102 will be at a 60-degree position in the next second.

As shown in block 206, the process flow 200 may include an anticipation circuit 108, wherein the anticipation circuit 108 is configured to generate an anticipation signal, wherein the anticipation signal is based on at least one of a latch-check position signal and the speed signal or a maximum speed signal and the position signal In some embodiments, the door braking system 101 may comprise an anticipation circuit 108 which is configured to determine whether at least one of two circumstances for the door 102 are occurring, such that the motor 120 controlling the door's movement should be connected to at least one braking resistor(s) 112 and disconnected from the drive circuit 122 by inputting power to the motor 120. In this manner, the motor 120 may act as a dynamic brake for the door 102 to slow down its speed and force before entering the latch check region. In some embodiments, and where the latch check region has already been met or is about to be met, the door braking system 101 may be configured to slow down the speed and reduce the force in the latch check region as well.

Additionally, and based on the position signal and speed signal, the door braking system 101—via the anticipation signal—may determine a future (or anticipated position) of the door 102 at a future period, such as an anticipated position based on the linear model. In some embodiments, the linear model may be updated by changing the resistor values and capacitor values within the anticipation circuit, which is described in further detail below.

In some embodiments, the process flow 200 may include a determination, based on the anticipated position, an anticipated speed. In some embodiments, and upon determining the anticipated position at the future time, the anticipation circuit 108 may be configured to determine the anticipated speed, based on the difference between the measured position of the door 102 from the filtered position signal and the anticipated position over the difference in time between the measured position and the anticipated position. In some embodiments, based on the differentiation between the filtered position signal and its data, the anticipation circuit 108 may comprise components (e.g., at least one operational amplifier) to generate a derivative of the difference in positions to determine the anticipated speed.

As shown in block 210, the process flow 200 may include a determination of when the anticipated speed exceeds an allowable speed or when the speed signal exceeds the anticipation signal (i.e., the anticipation limit signal), and in response, engage a relay to disconnect a drive circuit of the door to system controlling the door and connect at least one braking resistor to a motor controlling the door to slow the door. Further, and in some embodiments, the door braking system 101 may determine whether the anticipated speed 108 exceeds the maximum allowable speed (which may be changed based on the size and/or weight of the door).

As described above, the door braking system 101 may comprise the anticipation circuit 108 configured to determine whether (1) the filtered position signal and its associated data regarding the door's position (e.g., degree of the door's position) is outside the latch check region positions and whether the speed of the door is greater than the maximum allowable speed (the anticipated speed is greater than the maximum allowable speed); or (2) whether a motor current of the motor 120 controlling the door 102 is greater than a maximum allowable current. When at least one of these circumstances is true, the door braking system 101 will connect the motor 120 to the braking resistor(s).

In some embodiments, the process flow 200 may include an engagement of a relay 110, in an instance where the anticipated speed exceeds the maximum allowable speed, configured to disconnect a drive circuit 122 controlling the door 102 and connect at least one braking resistor 112 for the door 102 to a motor 120 controlling the door 102. Thus, and based on the presence of the anticipated speed meeting and/or exceeding the maximum allowable speed, then the door braking system 101 may begin slowing the door down before the door reaches the anticipated speed and anticipated position. For instance, such a braking resistor 112 (or a bank of braking resistors 112) may be configured to generate braking torque for the motor 120, such that any excess voltage from the motor 120 will be input to the braking resistor 112 to reduce the current used by the motor 120 for the door 102. Such braking resistor(s) 112 may be configured in series with the motor 120, such that the excess voltage from motor 120 is input only to the braking resistor 112 and not to other potential parallel components. In some embodiments, and where there are multiple braking resistors 112 in a braking resistor bank, the braking resistors 112 may be configured in parallel to each other such that the excess voltage from the motor 120 is evenly distributed.

Additionally, and where the current of the motor 120 is greater than a maximum allowable current, the door braking system 101 may additionally disconnect the current provided by drive circuit 122 to the motor 120 and connect the braking resistors 112 via the relay 110. Thus, in both or either instance, the door braking system 101 may be configured to slow down the speed and force of the door 102 before it reaches the latch check position/latch check region.

In some embodiments, the latch check position/latch check region, the maximum allowable speed, and/or the maximum allowable force may be determined based on a safety protocol, such as underwriters' laboratories (UL) requirements.

In some embodiments, the process flow 200 may include an engagement of the relay 110, in an instance where the anticipated speed does not exceed the maximum allowable speed, configured to connect the drive circuit controlling the door to the motor 120 controlling the door 102. In some embodiments, the door braking system 101 may connect, via the relay 110, the current from the drive circuit 122 to the motor 120 when at least one of the above instances does not occur. For instance, and as described herein, (1) when the anticipated speed does not meet and/or exceed the maximum allowable speed OR when the position of the door 102 is inside the latch check region, and (2) where the current of the drive circuit 122 does not exceed the maximum allowable current for the motor 120, the door braking system 101 may allow the drive circuit 112 to continue transmitting current to the motor 120.

FIG. 3 illustrates a process flow 300 for determining whether the door will exceed a predetermined safety parameter and/or for controlling the door to bring the door to a safe condition, in accordance with embodiments of the disclosure. In some embodiments, a system (e.g., similar to one or more of the systems described herein with respect to FIGS. 1A-1C and the circuits of FIGS. 6A-14) may perform one or more of the steps of process flow 300. For example, a door braking system 101 (e.g., the system 100 described herein with respect to FIG. 1A-1C) may perform the steps of process 300.

In some embodiments, and as shown in block 302, the process flow 300 may include a determination of a pre-latch check region, wherein the pre-latch check region comprises a plurality of different positions of the door different than the latch check region. By way of non-limiting example, the door braking system 101 may comprise a pre-determined pre-latch check region which is based upon the pre-determined latch check region.

For instance, the door braking system 101 may comprise a portion of the position signal of the door comprises a latch check position, and wherein the latch check position is a latch check region comprising a range of positions for the door and wherein the range of positions for the door is pre-determined (e.g., based on size, weight, and/or the like) and may be pre-programmed for the door braking system 101 for each door 102 and its size and/or weight. As used herein, the latch check region refers to at least one position proximate to the home position (the resting position of the door, such as where the door 102 meets the door frame and/or where the door 102 is flush with the door frame). In some embodiments, the latch check region may comprise a plurality of positions, such as a range of positions, which surround the home position and/or are immediately adjacent to the home position.

Further, as used herein, the latch check region is intended to allow the door 102 to close without slamming or damaging the door frame, where the door braking system 101 and/or a drive circuit 122 may be configured to ensure that the speed and/or the force with which the door 102 is closing (reaching the latch check region/home position) is less than a maximum allowable force or maximum allowable speed. Thus, the door braking system 101 and/or the drive circuit 122 may be configured to slow the door 102 down and/or reduce the force of the door 102 as it reaches the latch check region (while the door is in the pre-latch check region) and/or continuously monitor the current force and speed of the door 102 as it moves toward the latch check region. Thus, and by way of example, the pre-latch check region may comprise the region of door positions before the door reaches the latch check region, whereby the latch check region is pre-determined based on the weight and size of the door to determine at what point the door 102 must comprise a certain speed or force for the door 102 to avoid damage or avoid inflicting damage. Thus, and where the latch check region comprises a 20 degree range from the home position of the door 102, and where the door 102 is able to open to at least 90 degrees from the home position (and in some embodiments past 90 degrees), the pre-latch check region may comprise the 20 degrees to 90 degrees (or greater where the door can open a larger degree) range.

As referenced herein, the latch check region may comprise the similar latch region as that shown and described with respect to U.S. Pat. No. 8,527,101 entitled "Door Closer Assembly," which issued on Sep. 3, 2013. Additionally, U.S. Pat. No. 8,527,101 is incorporated herein by reference in its entirety, including the description of the door and its mechanical design.

In some embodiments, and as shown in block 304, the process flow 300 may include the determination, based on the position signal, a distance of the door 102 to the latch check region at a current time. By way of non-limiting example, the door braking system 101 may determine—based on the position signal received from the position sensor 103, a distance of the door 102 from the latch check region (e.g., based on the above example, a distance from the 20 degree position of the latch check region's limit)—by a distance from the position sensor 103 of the doorframe in real time. Based on the received filtered position signal, the door braking system 101 may determine a degree of the position for the door 102 in real time and determine an anticipated position signal based on an anticipated position and an anticipated speed signal for the anticipated speed.

In some embodiments, and as shown in block 306, the process flow 300 may include the generation of an anticipation limit signal based on combining the allowable speed and the distance of the door to the latch check region. For instance, and as described in detail above, the door braking system 101 may be configured to determine—based on the filtered position signal, the position signal for the door and its distance from the latch check region.

In some embodiments, and as shown in block 308, the process flow 300 may include the comparison of the anticipation limit signal and the speed signal to determine the anticipation signal. For instance, the process may comprise the a determination of an anticipation signal from a maximum speed of the door and a current position of the door. In some embodiments, this distance of the door from the latch region may be scaled based on the level of input voltage, based on the weight of the door, and/or the like.

In some embodiments, the anticipation signal may be generated based on first determining the latch check region, and based on this determination, determining a position or region reference near the latch position (e.g., a latch position, a latch check region, pre-latch-check region, and/or the like). Additionally, and in this embodiment, the process to generate the anticipation signal may further comprise a determination of the distance of the door a current period from the position or region reference (herein also referred to as the position region signal). In some embodiments, the process may further comprise a determination of the speed of the door based on the (current) position signal. Such as speed may additionally be scaled based on the weight of the door, the voltage, and/or the like. Once the position region signal and the speed signal of the door have been determined, both signals are combined to generate the anticipation signal for the current door position. Such an anticipation signal may additionally be referred to herein as the anticipation limit signal.

FIG. 4 illustrates a process flow 400 for determining whether the motor current for the motor of the door exceeds a pre-determined maximum motor current, in accordance with an embodiment of the disclosure. In some embodiments, a system (e.g., similar to one or more of the systems described herein with respect to FIGS. 1A-1C and the circuits of FIGS. 6A-14) may perform one or more of the steps of process flow 400. For example, a door braking system 101 (e.g., the system 100 described herein with respect to FIG. 1A-IC) may perform the steps of process 400.

In some embodiments, and as shown in block 402, the process flow 400 may include a drive circuit 122 associated with the motor 120 of the door 102, wherein the drive circuit 122 is connected to the relay 100. By way of non-limiting example, the door braking system 101 may be configured to be in operable communication (comprise a connection) to a drive circuit 112 which may be designed to monitor and/or control the movement of the door 102, the force of the door 102 as it opens and closes, and/or the like. For example, the force may be applied by an operator (e.g., such as an operator system or operator circuit) that exerts force on the door, which then allows the door to exert force on a person or object in its path. For instance, such a drive circuit 122 may comprise a digital monitoring device comprising software code in connection with the motor 120, whereby the software code may be designed and written to monitor and control the speed and force of the door 102, and the current being input to the motor 120. Thus, and in the instances where the drive circuit 122 may malfunction and/or where the drive circuit 122 may not in use on a door 102, the door braking system 101 described herein may be employed to monitor and/or slow down the door 102 during its operation. Further, and as described in detail herein, such as a drive circuit 122 may additionally be connected to a relay (e.g., relay 110 of FIGS. 1A-1C), which is designed to open and/or close the connections between the motor 120 and at least one of the drive circuit 122 or the braking resistors 112.

In some embodiments, and as shown in block 404, the process flow 400 may include a determination, based on the output of the drive circuit, a motor current for the motor 120 of the door 102. For instance, the door braking system 101 may determine—based on the output current of the drive circuit 122—and through the use of a current sensor (e.g., such as that shown as current sensor 121 of FIGS. 1A-1C) the current of the motor 120 for the door 102. Further, and upon determining the current of the motor 120—which may be viewed as an analog signal (a motor current signal) by the door braking system 101—the door braking system 101 may use the data of the motor current signal to determine whether the current of the motor 120 at a current and/or at a future period is or will be greater than a maximum allowable current.

In some embodiments, and as shown in block 406, the process flow 400 may include the determination of whether the motor current for the motor 120 of the door 102 exceeds a pre-determined maximum motor current. For example, the door braking system 101 may determine—using a relay 110—whether the current of the motor 120 meets and/or exceeds the maximum allowable current for the motor 120. For instance, and as shown herein, in the instance where the current of the motor 120 meets and/or exceeds the maximum allowable current, the relay 110 is automatically configured to disconnect the drive circuit 122 from the motor 120 and connect the braking resistors 112 to the motor 120.

In some embodiments, and as shown in block 408, the process flow 400 may include the engagement of the relay 110, in an instance where the motor current for the motor 120 of the door 102 exceeds the pre-determined maximum motor current, configured to disconnect the drive circuit 122 controlling the door 102 and connect the at least one braking resistor 112 for the door 102. In some embodiments, the pre-determined maximum motor current may be determined based on the specifications of the motor 120, based on the maximum allowable speed of the motor 120 as compared to the current, and/or the like. Thus, and where the drive circuit 122 is malfunctioning, the door braking system 110 may act as a backup or failsafe system to prevent the motor 120 from being damaged, from damaging the door 102, the door frame, an object (e.g., a person, equipment, or the like) located adjacent the door 102, and/or the like.

In some embodiments, and as shown in block 410, the process flow 400 may include an instance where the relay 110 is configured to connect the drive circuit 112 to the motor 120 controlling the door 102 in the instance where at least one of the anticipated speed does not exceed the maximum allowable speed or where the motor current for the motor 120 of the door 102 does not exceed the maximum motor current. By way of non-limiting example, the door braking system 101 may continue to connect and/or re-connect the drive circuit 122 to the motor 120 when the anticipated speed does not exceed (or meet) the maximum allowable speed or where the motor current for the motor 120 does not exceed (or meet) the maximum allowable current. For instance, and where the relay 110 is connected to the drive circuit 122 at the normally open terminal, the relay 110 may be engaged to switch the connection (open the connection to the braking resistors and close the connection to the drive circuit) to connect the drive circuit to the motor 120. Additionally, and where the position of the door 102 is within the latch check region, the door braking system 101 may also connect and/or re-connect the drive circuit 122 to the motor 120 when at least the anticipated speed is greater than the maximum allowable speed.

FIG. 5 illustrates a process flow 500 for engaging a relay 110 to disconnect the drive circuit 122 controlling the door 102 and connect the at least one braking resistor 112 for the door 102 to the motor 120 controlling the door 102 for a delay period, in accordance with an embodiment of the disclosure. In some embodiments, a system (e.g., similar to one or more of the systems described herein with respect to FIGS. 1A-1C and the circuits of FIGS. 6A-14) may perform one or more of the steps of process flow 500. For example, a door braking system (e.g., the system 100 described herein with respect to FIG. 1A-1C) may perform the steps of process 500.

In some embodiments, and as shown in block 502, the process flow 500 may include the step of applying a delay circuit, wherein the delay circuit engages the relay 110 to electronically connect the at least one brake resistor 112 to the motor 120 and disconnect the drive circuit 122 for a delay period, after a trigger is received. Thus, and in such embodiments, the door braking system 101 may further comprise a delay circuit intended for the relay 110 to connect the braking resistor(s) 112 to the motor 120 for a particular pre-determined period (the delay period) before reconnecting the drive circuit 122 to the motor 120 and re-assessing whether the door 102 has slowed down in force or speed, and/or whether the current for the motor 120 has decreased to below the maximum allowable current. Such a trigger may comprise a trigger indicating the speed signal has exceeded the maximum allowable speed, the force of the door has exceeded the maximum allowable force, the speed signal has exceeded the anticipation limit signal, and/or the like.

In some embodiments, the delay period may comprise a pre-determined period which is assigned by an operator of the door braking system 101, an installer of the door braking system 101, and/or the like. For instance, and in some embodiments, the delay period may comprise a period of 1.5 seconds. In some other embodiments, the delay period may comprise a period of 1 second, two seconds, three seconds, four seconds, five seconds, and/or the like (or a range that falls within, overlaps, or is outside of these values).

In some embodiments, and as shown in block 504, the process flow 500 may include the step of collecting updated position sensor data. For example, the updated position sensor data may be collected and updated continuously. In some embodiments, the door braking system 101 may collect updated position sensor data at a time after the delay period has ended and after a predetermined safe condition has been met (e.g., the force of the door is below a predetermined force the speed of the door is below a predetermined maximum speed, and/or the like), such as the time immediately following the relay's disengagement of the braking resistor(s) 112 from the motor 120. Such updated position sensor data may be filtered by the position filter 104 in a similar manner as that described hereinabove and below. Additionally, and in some embodiments, the delay period may continuously restart such that the relay is continuously re-engaged for the braking resistor(s) 112 until the predetermined safe condition is met, including at least one additionally delay period after the safe condition is met. Such a continuous re-engagement and post-safety condition re-engagement allows for greater safety measures for the door.

In some embodiments, and as shown in block 506, the process flow 500 may include the step of determining, in response to the updated position sensor data, an updated anticipation limit signal of the door 102. For example, the door braking system 101 may use the updated position sensor data to generate and/or determine the updated anticipation limit signal (e.g., anticipated speed limit) for the door 102 at a future period after the delay period has ended. Such a determination and/or generation of the updated anticipated speed may occur in a similar manner as that described hereinabove and/or below.

In some embodiments, and as shown in block 508, the process flow 500 may include the step of determining, based on the updated anticipated signal, whether a combination of the updated position sensor data and speed signal exceeding a predetermined safe condition or the ability of the control system or monitor system to bring the door to a safe state before it reaches the latch of the door. For instance, the door braking system 101 may determine whether the updated anticipated speed still meets and/or exceeds the maximum allowable speed for the door despite the previous instance of connecting the braking resistors to the motor.

In some embodiments, and as shown in block 510, the process flow 500 may include the step of engaging the relay 110, in an instance where the updated position sensor data and updated speed signal exceeds the updated anticipation limit signal, to disconnect the drive circuit controlling the door 102 and connect the at least one braking resistor 112 for the door 102 to the motor 120 controlling the door 102 for the delay period. Thus, and where tq1 he door 102 is still moving at a greater speed than the maximum allowable speed and/or where the door braking system 101 anticipates the door 102 will begin moving at a greater speed than the maximum allowable speed, the door braking system 101 may re-engage the relay 110 to connect the braking resistor (s) 112 to the motor 120 for the delay period, again. Similarly, and where the motor current is greater than the maximum allowable current, the door braking system 101—through the relay 110—may re-engage the relay 110 to connect the braking resistor(s) 112 to the motor 120 for the delay period, again. As understood by those skilled in the art, the process described herein may be iterative until at least one of the following instances is met (1) the position of the door 102 reaches the latch check region and (2) the anticipated speed of the door 102 is less than the maximum allowable speed; or (3) where the current input to the motor 120 is less than the maximum allowable current.

In some embodiments, the door braking system 101 may comprise slightly different logic and circuitry than disclosed above. For instance, and where a latch check position or latch check region may remain the same and the pre-latch check position or regions may remain the same, then the door braking system 101 may allow for varying a maximum allowable speed based on the position. Therefore, and as the position changes for the door 102, the door braking system 101 may determine a maximum allowable speed to keep the door 102 within the force and speed requirements. Such an exemplary circuit is described below with respect to FIGS. 13-14.

Exemplary Circuit Schematics

As shown in FIGS. 6A-6B, FIG. 6A illustrates an exemplary position filter circuit 650 and its associated electrical components, in accordance with an embodiment of the disclosure. For instance, and as shown in its exemplary configuration, the position filter (similar to the position filter 104 described with respect to FIGS. 1A-1C) may comprise a configuration of a plurality of resistors (e.g., R1 601, R2 602, R3 603, R4 604, R5 605, R6 606, R7 607, and R8 608), a plurality of capacitors (e.g., C1 611, C2 612, C3 613, C4 614, and C5 615), and a plurality of operational amplifiers (e.g., Op Amp1 621 and Op Amp2 622).

As shown in the exemplary position filter circuit 650, voltage from a position sensor output voltage 629 may be passed through resistors 601 and 602, until reaching the positive terminal of the operational amplifier 621. In some embodiments, the position filer circuit 650 may comprise a capacitor C1 and a capacitor C2, which may be used by the position filter to store reduce the noise of the input voltage 629 before reaching the first operational amplifier 621. Additionally, and by inputting a feedback loop of the voltage after being reduced over resistor R4 604, whereby the feedback loop may comprise a feedback capacitor, the Op Amp1 will reduce noise between the input terminals (positive and negative terminals) and the output voltage of Op Amp1 621 and reduces the gain between the output of the Op Amp1 621 and input voltage at the positive terminal. Thus, and as the door 102 gets closer to the latch check region, the voltage may increase before being input to Op Amp1 621 and being reduced to a manageable level for the position filter. Further, and after an output from the Op Amp1 621, the voltage output may be transmitted to a second operational amplifier (Op Amp2 622) which employs a feedback capacitor (C4 614) to limit the output bandwidth of the position signal before being input to the next portion of the anticipation circuit (the signal filter and/or the operational amplifier configured to combine the anticipated speed and position signal). Thus, and based on the circuit described herein, the output voltage 630 may comprise a position filter voltage (and signal) 630 designed to determine—at what point—the latch check region occurs (or begins) and ends.

For instance, and as the door 102 opens, the position sensor 103 may generate the voltage indicating the position of the door 102 to decrease as the door opens. Thus, and through the use of an operational amplifier, like that shown as Op Amp1 621, the operational amplifier may be used to scale the voltage.

In some embodiments, the resistor values for the resistors R1 601, R2 602, R3 603, R4 604 may each comprise the same value. For instance, and in some embodiments the value for each of the resistors R1 601, R2 602, R3 603, R4 604 may comprise a 49.9 kΩ (kilohms). Similarly, the resistor values the resistors in parallel with the capacitors (C1 611 and C2 612) may also comprise the same value (e.g., R5 605 and R6 606) may comprise a value of 400 kΩ. With respect to the power of each capacitor C1 611 and C2 612 may comprise the same value, such as 22 nF (nano Farads). Additionally, and in some embodiments, the resistors associated with the second operational amplifier (Op Amp 2 622 and its resistors R7 607 and R8 608) may comprise the same value, such as 12 kΩ. In some embodiments, the capacitors associated with the second operational amplifier (Op Amp2 622), C4 613 and C5 615 may comprise the same value, such as 470 nF.

With respect to FIG. 6B, FIG. 6B illustrates technical components of an exemplary latch check region filter circuit 631 and its associated electrical components 650, in accordance with an embodiment of the disclosure. With respect to the latch check region filter circuit 631, the circuit is designed and configured with a low-pass filter using one operational amplifier (Op Amp3 658), two resistors (R8 653 and R9 654), and two capacitors—which both are used with a negative feedback loop (C6 C56 and C7 657), which is used to generate a latch check region position filter voltage 660. Thus, and based on this circuit, the voltage input (latch check position region voltage 651) may be fed through the low pass filter to generate an output voltage (the filtered signal of the latch check region voltage 650) which may be used by the door braking system 101 to allow the lower position voltage signal for the latch check region when the door 102 moves further away from the latch check region, and attenuate (or reduce) the position voltage as the door 102 moves closer to the latch check region. In this manner, the latch check region filter creates a cutoff for the voltage to differentiate the latch check region from the pre-latch check region.

Further, and in some embodiments, the resistor values for R8 653 and R9 654 may comprise the same value, such as 22 kΩ. Additionally, the capacitors C6 656 and C7 657 may additionally comprise the same power, such as 600 nF.

Additionally, and as shown with respect to the latch check position region signal (voltage) 651, the latch check region filter 631 may comprise a potentiometer R10 632 configured to receive the latch check position region signal (voltage) 651 and determine the position of the door 102, while resistor R11 633 may act to dissipate the remaining voltage and the capacitors C9 635 and C8 634 may act to filter out the excess noise of the signal for the latch check position region signal (voltage) 651 and to reduce any ripple voltage or ripple current that may occur from the latch check position region signal (voltage) 651. In this manner, the capacitor (e.g., capacitor C8 634) may act to steady the voltage and current for the potentiometer R10 632, and thus, allow an accurate and steady determination of the position of the door 102.

Additionally, and in some embodiments, the resistor value for potentiometer may comprise a value up to—in some cases—50 kΩ. In some embodiments, the series resistor R11 633 may comprise a value of 18 kΩ. In some embodiments, the capacitor C8 may comprise the capacitance 22 μF (micro-Farads).

As shown in FIGS. 7A-7B, FIG. 7B illustrates an exemplary speed filter 106 and an exemplary speed check filter, and their associated electrical circuits 700, 735, 740, and 750, in accordance with an embodiment of the disclosure. For instance, and as shown in its exemplary configuration, the exemplary speed filter 106 and its circuit 735 may be configured to output a speed control voltage 701 based on an input voltage (e.g., input voltage 15 V), voltage splitting resistors R12 710 and R13 713 (whereby the voltage splitting resistors may comprise the same or different values, such as the same values of 6.8 kΩ, and parallel capacitors C10 711 and C11 712 (which also may comprise the same or different values, such as the different values of 2.2 μF for C10 711 and 4.7 μF for C 11 712). In some embodiments, the speed control voltage 701 may be generated by inputting an input voltage of 15 V (volts) to the voltage splitter (R12 710) and measuring the voltage between R12 710 and R13 713, with the capacitors acting to reduce noise in the output signal of the speed control voltage 701. Thus, the speed control voltage—as used and described herein—may be used for the purpose of setting the maximum allowable speed for the door and may be input to the operational amplifier Op Amp4 702 of the speed filter 106.

For instance, and upon inputting the center speed voltage 701 the buffer circuit 700, whereby the center speed voltage 701 is input to the positive terminal of the operational amplifier Op Amp4 702 (which comprises a negative feedback loop to the negative terminal of the operational amplifier), the Op Amp4 702 with the negative feedback to generate a voltage follower for changing the impedance between the input voltage (center speed control 701) and the output voltage (speed control filter voltage 703), whereby the input voltage and the output voltage would remain the same or very similar. Such a change in the impedance between the input voltage (center speed voltage 701) and the output voltage (speed control filter voltage 703) allows for the output voltage (speed control filter voltage 703) to be input to a secondary circuit (circuit 740) for generation of the speed maximum filter voltage (704).

Thus, and in this manner, operational amplifier Op Amp4 702 generates the speed control filter by determining the center speed voltage 701 of the door as it moves from the latch position to a fully open position, and back again, and generating the speed control filter voltage 703 to comprise the same voltage as the center speed voltage 701, while also allowing the speed control filter voltage 703 to be used in a potentiometer circuit (e.g., potentiometer R14 715 in circuit 740) with voltage splitting resistors R15 714 and R16 716, and capacitors C12 717 and C13 718. Therefore, and as the door moves between the latch position to the fully open position and back again, the center speed voltage 701 is generated as a negative or positive value (whereby the negative value may indicate the door is closing and a positive value may indicate the door is opening). Thus, and based on this configuration, the speed control filter voltage 703 may be used to generate the speed maximum filter voltage 704, which is based on the potentiometer's (R14 715) determination of position of the door and its associated maximum allowable speed for each position of the door (e.g., degree position of the door), whereby the potentiometer may change the maximum allowable speed voltage as the door moves further and/or closer to the latch check region. Thus, and as the door moves, the voltage splitting resistor values (R15 714, R16 716, and R14 715) may increase or decrease to generate the maximum allowable speed voltage for each position.

In some embodiments, the resistor values for the voltage splitting resistors R15 714 and R14 715 may comprise the same and/or different values, such as the same values of 9.09 kΩ. In some embodiments, the potentiometer R16 716 may comprise its own different value from each of the other resistors (R14 715 and R15 714), such as 50 kΩ. As understood by one skilled in the art, each of these resistor values may change based on the specifications of the door (size, weight, and/or the like) and based on the maximum allowable speed as outlined by speed requirements for doors. Additionally, and in some embodiments, the capacitors C12 717 and C13 718 may comprise the same and/or different values, such as the different value of 2.2 µF for C12 717 and 1 µF for C13 718.

As shown in FIGS. 7A-7B, FIG. 7B illustrates an exemplary speed filter 106 and its associated electrical circuit (speed control filter circuit 750). Thus, and as shown in FIG. 7B, the exemplary speed control filter circuit 750 may comprise voltage inputs of the speed control filter voltage 703 and the position filter voltage 630. As shown in speed control filter circuit 750, the speed control filter circuit 750 may comprise two operational amplifiers Op Amp5 759 with a positive input terminal connected to the speed control filter voltage 703 and a negative input terminal connected to the position filter voltage 630. However, and as shown in speed control filter circuit 750, the inputs of Op Amp5 759 may additionally comprise resistors, R16 756 and R17 757, whereby each of these resistors may comprise different values, such that each input to the Op Amp5 759 is scaled properly. For instance, R16 756 may comprise a small resistance value such as 1 kΩ and R17 757 may comprise a larger resistance value, such as 10 kΩ. Additionally, the negative input terminal associated with Op Amp5 759 may comprise a capacitor used to clean the position filter voltage 630.

The Op Amp5 759 may additionally comprise a negative feedback loop with a resistor R18 760 and a capacitor C15 761, whereby both the feedback resistor R18 760 and capacitor C15 761 may be used to create a differential amplifier. In this manner, the position filter voltage 630 and the speed control filter circuit 750 are used to generate the current speed of the door 102 by first differentiating the input signals and then generating a derivative (by second differentiation) of the output signal from Op Amp5 759 (where the derivative is described in more detail below).

Additionally, and with respect to the negative feedback loop of Op Amp5 759, the resistor R18 760 may—in some embodiments—comprise a resistance value of 750 kΩ and the capacitor C15 761 may comprise a capacitance value of 10 nF (nano farads).

Subsequently, after generating the output from Op Amp5 759, the output voltage from Op Amp5 759 may be input to a series resistor R19 762 to reduce the voltage created by Op Amp5 759. Similar to above, the output of Op Amp5 759 (after feeding through resistor R19 762) may be compared with the speed control filter voltage 703 for Op Amp6 765 to derive the speed of the door 770 and its associated signal.

Thus, and as shown herein, Op Amp6 765 may comprise a positive input from Op Amp 5 759 (after resistor R19 762) and a negative input from speed control filter voltage 703, where each of the inputs for Op Amp6 765 may be used with a differential capacitor (C16 763) and differential resistor (R20 764), a series resistor R21 766, and a negative feedback loop with a resistor R20 767 and a capacitor C17 768. In this manner, Op Amp6 765 may use both input voltages (the reduced output voltage from Op Amp5 759 and speed control filter voltage 703) to determine the speed of the door and whether the speed exceeds the maximum allowable speed (speed control filter voltage 703). The Op Amp6 765 determines this by differentiating between the maximum allowable speed (speed control filter voltage 703), the latch check region positions (the position filter voltage 630) to generate a maximum allowable speed at particular positions, and by further differentiating the maximum allowable speed at particular positions and the maximum allowable speed (speed control filter voltage 703) to determine the derivative of the speed control filter voltage 703 as compared to the position of the door at each position, which determines the overall speed for the various positions.

Additionally, and as shown in speed check filter circuit 750, each of the resistors with respect to Op Amp6 765 may comprise the same or different values, such as the R19 762 comprising resistance value of 10 kΩ, R20 764 such as 39 kΩ, R21 766 such as 10 kΩ, and R20 767 such as 39 kΩ. In some embodiments, the capacitors for Op Amp6 765 such as capacitance value 150 nF for C16 763 and a capacitance value of 150 nF for C17 768.

As shown in FIG. 8, FIG. 8 illustrates technical components for determining the anticipation limit signal by combining speed and latch check position of the door through the use of an exemplary Position Sensor Compared to Latch Check Region Circuit 801 and its associated components, which are used to generate a speed at position voltage 801 whereby the speed is determined based on the position, including but limited the pre-latch check region and/or latch check region positions. The speed at position circuit may comprise various inputs, such as the latch check region position filter voltage 660 and the position filter voltage 630 to generate a speed at a position voltage 820. The speed at a position voltage may be used as a limiting signal (e.g., an anticipation limit signal like that described herein) by the door braking system 101 which may then be used for comparison against at least one of an anticipated speed signal at a current time which is combined with a distance of the door to a latch check region or pre-latch check region, or comparison with an anticipated limit signal which is a combination of a speed signal and a position region signal. Thus, and through the use of multiple operational amplifiers (Op Amp7 816 and Op Ampt8 817) in combination with various resistors (R22 802, R23 803, R24 804, R30 810, R26 806, R27 807, R28 808, and R29 809), a potentiometer (R25 805), a diode (e.g., Zener diode, D1 818), and capacitors (C18 811, C19 812, C20 813, C21 814, and C22 815), arranged in the configuration shown herein with respect to FIG. 8, the exemplary Position Sensor Compared to Speed at Position Circuit 801 may generate the speed at a position voltage 820 for each of the positions of the door. For instance, and by basing the speed at position voltage 820 on the latch check region position filter voltage 660 and the position filter voltage 630, the Position Sensor Compared To Latch Check Region Circuit 801 can determine the speed at each position for the positions outside the latch check region (the pre-latch check region) and the speed with respect to the latch check region, which may change due to the potentiometer's R25 805 value for each position (pre-latch check region position and latch check region position).

As described herein, each of the resistors shown with respect to Position Sensor Compared to Latch Check Region Circuit 801 may comprise various values, such as 1 kΩ for R22 802 and R23 803, 15 kΩ for R24 804, 6.8 kΩ for R30 810, 16 kΩ for R26 806, 6.8 kΩ for R27 807, 16 kΩ for R28 808, and 510 kΩ for R29 809. In some embodiments, the capacitors for the Position Sensor Compared to Latch Check Region Circuit 801 may comprise various values, such as 33 µF for C18 811, 100 nF for C19 812, 270 nF for C20 813, 270 nF for C21 814, and 10 nF for C22 815. The potentiometer as shown in Position Sensor Compared to Latch Check Region Circuit 801 may comprise a value of 50 kΩ and the Zener diode may comprise a value of 2.5 V.

As shown in FIGS. 9A-9D, FIG. 9A illustrates an exemplary Speed Comparison Circuit 901, whereby the Speed Comparison Circuit 901 uses input voltages of a maximum speed filter voltage 902 and a speed of the door (voltage) 770 to generate a speed comparator voltage 910. The Speed Comparison Circuit 901 may implement a positive feedback loop operational amplifier (Op Amp9 906) with a feedback resistor (R33 905) and series resistors for the input terminals (R31 903 and R32 904). In some embodiments, the resistors for the Speed Comparison Circuit 901 may comprise different resistance values, such as 4.99 kΩ for R31 903, 1 kΩ R32 904, and 470 kΩ for R33 905.

As shown in FIGS. 9A-9D, FIG. 9B illustrates an exemplary Latch Check Region LED circuit 920 which further comprises various components, such as resistors (R34 921, R35 922, R36 923, R37 925, R38 926, and R39 927), a positive feedback operational amplifier (Op Amp9 931), a light emitting diode (LED) D2 928, and a N-Channel MOSFET (MOS 930) comprising a Zener diode D3 929.

Latch Check Region LED circuit 920, which is configured to receive a position filter voltage, a speed at position voltage 820, and generate a position comparator voltage 924, which is then used to input into an N-Channel MOSFET (shown as "MOS" 930) (including a Zener diode (D3 929)) and an LED (D2 928) connected to the N-Channel MOSFET's (MOS 930) drain, such that when there is no voltage from the position comparator voltage 924 after input to the resistor R37, then the N-Channel MOSFET (MOS 930) may, then the LED (D2 928) will be turned off (indicating that the position associated with the position voltage is outside the latch check region). However, and when the position comparator voltage 924 is greater than the threshold voltage for the N-Channel MOSFET (MOS 930) (e.g., the position comparator voltage 924 comprises a high voltage and indicates the door is at or close to the home position), then the LED D2 928 will light up.

Thus, and based on the Latch Check Region LED circuit 920, an operator setting up the door braking system may accurately and efficiently determine the latch check region and its limits, based on the LED indicators.

In some embodiments, and as shown herein, each of the resistors of the Latch Check Region LED circuit 920 may comprise various resistance values, such as 2.8 kΩ for R34 921, 1 k kΩ for R35 922, 470 k kΩ for R36 923, 10 kΩ for R37 925, 4.99 kΩ for R38 926, and 49.9 kΩ for R39 927.

As shown in FIGS. 9A-9D, FIG. 9C illustrates an exemplary Force Comparison 1 Circuitry 940 and its various components, which may comprise various resistors, an operational amplifier, and various inputs including As shown in FIGS. 9A-9D, FIG. 9D illustrates an exemplary Force Comparison 2 Circuitry 950 and its various components, which may comprise various resistors, an operational amplifier, and various inputs.

Each of the circuits of FIGS. 9A-9D compare one voltage to another and depending on the input configuration of the input voltage, the output voltage is either high or low based on the input(s).

As shown in FIG. 10, FIG. 10 illustrates an exemplary Relay Hold Circuit 1001 and its various components, which may comprise various resistors, various operational amplifiers, various inputs including a Trip voltage input and power supplies (e.g., 15 V power supplies, 24 V power supplies, and/or the like). Such a Relay Hold Circuit 1001 allows for the delay period of the relay circuit to connect the braking resistors for a delay period and/or multiple delay periods.

As shown in FIG. 11, FIG. 11 illustrates an exemplary Force Current Circuit 1101 and its various components, which may comprise various resistors, various operational amplifiers, various capacitors, various Zener diodes, and a relay.

As shown in FIG. 12, FIG. 12 illustrates an exemplary Glitch Filter Circuit 1201 ant its various components, which may comprise various resistors, capacitors, NAND gates, and an operational amplifier.

As shown in FIGS. 13-14, For instance, and with respect to FIG. 13, a Speed Limit Signal as a Function of Position Circuit 1301 is provided. In some embodiments, the Speed Limit Signal as a Function of Position Circuit 1301 may be used as an alternative method and system to generate an anticipation limit signal. With respect to the Speed Limit Signal as a Function of Position Circuit, and similar to the input voltages and output voltages described above, the position of the door may be determined based on the position sensor output associated with the door. However, in this embodiment, the latch check position input voltage 1302 may be unchanged between door braking system instances as the latch check position for each door will remain unchanged.

Similar to the disclosures and circuits provided above, a scaled position output voltage 1302 may be determined by inputting the position sensor output voltage 629 and the latch check position 1302 to a negative feedback operational amplifier (Op Amp20 1305). Further, and as shown in FIG. 13, each of the voltages may additionally input to a resistor, such that the total voltage input to the positive terminal of the operational amplifier via a splitting bank of resistors, which may comprise the same resistance value—such as 10 kΩ.

Additionally, and based on the generation of the scaled position voltage 1303 and the latch check position 1302, each of the scaled position voltage 1303 and the and the latch check position 1302 may each be input to an operational amplifier after being fed through at least one resistor (e.g., such as R72 1306 for the scaled position voltage 1303 and R74 1308 for the latch check position 1302 voltage). Similar to the circuits described above, the operational amplifier (Op Amp21 1317) may comprise a negative feedback loop comprising a resistor (R75 1310) and a capacitor (C40 1309). In some embodiments, each of these resistors may comprise the same and/or different resistance values such as 50 kΩ for R72 1306, such as 50 kΩ for R74 1308, such as 150 kΩ for R73 1307, and such as 150 kΩ for R75 1309. Similarly, and in some embodiments, the capacitors may also comprise the same or different capacitance values, such as 20 nF for C41 1310 and 20 nF for C40 1309.

Further, and generating the output from Op Amp21 1317, the output of Op Amp21 1317 may be input to a resistor (R74 1311) which may be used to reduce the voltage of Op Amp21's output before being input to the second operational amplifier (Op Amp22 1318). Additionally, such an Op Amp22 1318 may also comprise a negative feedback loop with the output from Op Amp21 1317, a resistor R74 1311, a feedback resistor R76 1313, and a capacitor C43 1316. As for the positive input for Op Amp21 1318, a maximum velocity voltage 1320 may be input after going through a resistor R75 1312. In some embodiments, and as shown in FIG. 13, Op Amp21 1318 may comprise a resistor R77 1314 and a capacitor 1315 used to reduce the noise of the maximum velocity voltage before entering Op Amp21 1318. Thus, and based on each of these inputs and this particular configuration, FIG. 13 may generate a maximum velocity slope voltage 1330 for the door.

With respect to FIG. 14, a velocity trip voltage circuit 1401 is exemplarily provided. For instance, and as shown in exemplary circuit 1401, a plurality of operational amplifiers used to differentiate between the voltages of pre-latch check position 1302 and a position voltage 629 and differentiate between the generated velocity and the maximum velocity slope 1320, to determine whether the door 1025—at a current time—is within the pre-latch check region and to determine whether the velocity meets and/or exceeds the maximum velocity slope. In this manner, and based on both inputs, the operational amplifiers may determine where both instances are true (e.g., where each of the amplitudes for each of the voltage inputs comprise a certain minimum threshold to be true), and then the velocity trip voltage circuit 1401 may input both operational amplifier outputs to an AND gate (AND gate1 1403). In the instance where at least one of the operational amplifiers returns an amplitude of the signal less than 1 (considered a zero in analog signals), then the velocity trip voltage will comprise a zero or near zero value. In the instance where all of the inputs for Op Amp22 1401 and Op Amp23 1402 (whereby each operational amplifier will output a one value or near one value for the signals), then the AND gate 1403 will output a one—which will indicate that a velocity trip has occurred, and the braking resistors should be connected to the motor 120.

Additional or Alternative Aspects of a Door Monitoring System with a Braking System As described herein a door monitoring system may be provided having a braking system which may be engaged to slow the door. For example, the braking system may be engaged to slow the door when one or more operating parameters of the door are outside of one or more threshold operating parameters.

The inventors have recognized that, in some embodiments, it is advantageous to provide variable braking. That is, the braking system is configured such that a braking applied to the door to slow the door may be varied. In some instances, it may be desired to brake the door more or less gently. Configuring the braking system to enable variable braking allows the system to adapt the braking of the door as needed. Accordingly, in some embodiments, the braking system alternatively comprises a variable braking component that enables the braking system to perform variable braking of a door.

FIG. 1E illustrates technical components of an exemplary door monitoring system, in accordance with embodiments of the disclosure. For example, FIG. 1E illustrates the door monitoring system 100 shown in FIG. 1A with braking resistor(s) 112 being replaced by variable braking 1802. The variable braking 1802 enables the door braking system 101 to implement variable braking, as described herein.

Absent variable braking, a braking force is proportional to a current passing through the braking resistors 112. The current is dependent on a speed of the door. Accordingly, the braking force applied to the door, absent implementation of variable braking, is controlled based on a speed of the door. By contrast, using variable braking, a braking force applied to the door is controllable, That is, the braking force applied to the door is not limited based on the speed of the door, but rather can be adjusted based on one or more parameters.

For example, an amount of braking applied to the door may be based on the one or more operating parameters of the door described herein (e.g., detected position, speed, anticipated position, and/or anticipated speed). In some embodiments, the amount of braking applied to the door may be based on one or more characteristics of the door, such as a weight of the door. As an example, it may be desired to start braking earlier and/or apply a larger braking force to a relatively heavy door. In some embodiments, the amount of braking applied to the door may be based on a combination of one or more parameters and/or characteristics described herein.

In some embodiments, the amount of braking applied to a door comprises a rate at which the door is slowed (e.g., a deceleration rate). In some embodiments, the amount of braking applied to a door additionally or alternatively comprises a time at which braking is applied to the door. In some embodiments, the amount of braking applied to a door additionally or alternatively comprises a position at which braking is applied to the door (e.g., a distance relative to a latch).

The variable braking may be implemented in any suitable way. For example, in the door braking system 101 of FIG. 1A, current is input to braking resistors 112. The variable braking 1802 may modify door braking system 101 by adding a component that enables the current input to and/or output from the braking resistors 112 to be modified. In some embodiments, variable braking is implemented using pulse width modulation techniques that modify the current input to the braking resistors 112. In some embodiments, the variable braking may be implemented using one or more transistors (e.g., a metal-oxide-semiconductor field-effect transistor (MOSFET) and/or a bipolar junction transistor (BJT)) which may select a path for the current among paths of different resistance and/or which may reduce an amount of current passing through the one or more transistors.

Although the door monitoring systems are illustrated and described herein as being implemented with analog circuitry, it should be understood that the door monitoring systems may alternatively be implemented, at least in part, using digital components. For example, in some embodiments, at least part of the door braking system is implemented using digital components, including one or more processors for performing one or more steps of the techniques described herein.

FIG. 1D illustrates technical components of an exemplary door monitoring system, in accordance with embodiments of the disclosure. For example, FIG. 1D illustrates the door monitoring system 100 of FIG. 1A, where components of the door braking system 101 are implemented using digital components.

As shown in FIG. 1D, the anticipation circuit 108 is replaced with digital circuitry 1800. In some embodiments, the speed filter 106 is replaced with digital circuitry 1800. In some embodiments, the position filter 104 is replaced with digital circuitry 1800.

The digital circuitry 1800 comprises one or more controllers (e.g., one or more processors) which may have digital logic for performing the functions of the anticipation circuit 108, the speed filter 106, and/or the position filter 104. For example, the digital circuitry 1800 may determine a position of a door based on output from a position sensor. In some embodiments, determine a speed of the door based on a position of the door, determine an anticipated position of a door at a future period based on a position of the door and a speed of the door, determine an anticipated speed of the door based on an anticipated position of the door, determine when the anticipated speed of the door exceeds an allowable speed based on the anticipated speed of the door, and/or engage a relay configured to disconnect a drive circuit of the door system controlling the door and connect at least one braking resistor to a motor controlling the door to slow the door.

As shown in FIG. 1D, the digital circuitry 1800 may receive sensor data as input. For example, the digital circuitry 1800 may receive a position signal from a position filter 104. In some embodiments, the digital circuitry 1800 may comprise the position filter 104 and may therefore receive sensor data from the position sensor 103. As shown in FIG. 1D, the digital circuitry 1800 may receive a motor current signal from current sensor 121. The digital circuitry may provide a signal to the relay 110 as output. For example, based on the one or more parameters of the door, the digital circuitry 1800 may provide a signal to the relay 110 instructing the relay to disconnect a drive circuit of the door system controlling the door and connect at least one braking resistor to a motor controlling the door to slow the door. The digital circuitry 1800 may comprise one or more analog-to-digital converters and/or one or more digital-to-analog converters that facilitate the digital circuitry 1800 receiving input and/or providing output to other components of the door monitoring system.

FIG. 1F illustrates an example method performed by the system of FIG. 1D, in accordance with embodiments of the disclosure. One or more steps of the example method 1900 illustrated in FIG. 1F are performed by the digital circuitry 1800.

The example method 1900 may begin at act 1902 where a position of the door is determined. For example, a position of the door may be determined by a position sensor of the door monitoring system. In some embodiments, determining the position of the door may comprise controlling the position sensor to obtain a measurement of a position of the door. In some embodiments, determining the position of the door may comprise receiving a measurement of a position of the door from the position sensor. In some embodiments, determining the position of the door may comprise generating a position signal.

At act 1904, a speed of the door is determined. The speed of the door may be determined based on the output of the position sensor. For example, the speed of the door may be determined based on a position signal representing a position of the door. Act 1904 may be performed by digital circuitry 1800, for example, according to the techniques described herein for determining a speed of a door.

At act 1906, an anticipated position of the door for a future period is determined. For example, the anticipated position of the door for a future period may be determined based on the output of the position sensor (e.g., based on a position signal generated based on a measurement by the position sensor) and the determined speed of the door. Act 1906 may be performed by digital circuitry 1800, for example, according to the techniques described herein for determining an anticipated position of the door.

At act 1908, an anticipated speed of the door is determined. For example, the anticipated speed of the door may be determined based on the anticipated position determined at act 1906. Act 1908 may be performed by digital circuitry 1800, for example, according to the techniques described herein for determining an anticipated speed of the door.

At act 1910, it is determined whether the anticipated speed exceeds a threshold. For example, at act 1910, the anticipated speed is compared to an allowable speed threshold for the door to determine whether the anticipated speed exceeds the allowable speed threshold. Act 1910 may be performed by digital circuitry 1800, for example, according to the techniques described herein for determining whether an anticipated speed exceeds a threshold.

If it is determined that the anticipated speed does not exceed a threshold, the method 1900 may return to act 1902, or alternatively, may end. If it is determined that the anticipated speed does exceed the threshold, the method may proceed to act 1912. At act 1912, when it is determined that the allowable speed exceeds the threshold, a relay is engaged. Engaging the relay may disconnect a drive circuit of a door system controlling the door and connect at least one braking resistor to a motor controlling the door to slow the door. Act 1912 may be performed at least in part by digital circuitry 1800, for example, according to the techniques described herein for engaging a relay.

Accordingly, FIG. 1D illustrates a door monitoring system where at least some of the components are implemented in digital circuitry. FIG. 1F illustrates a method where at least some of the steps are performed by digital circuitry. It should be understood that one or more alternative or additional components of the door monitoring system may be implemented in digital circuitry, in some embodiments, and aspects of the technology are not limited in this respect.

Exemplary Circuit Schematics Door Systems Including a Controller and the Door Monitoringt System As previously described herein, FIGS. 15-17 illustrate embodiments of the door system 40 which may utilize the digital controller 58 and/or the door monitoring system 100. As such, during normal operation within the operating parameters (e.g., pre-set for the door system 40 or as altered), the door system 40 is controlled by the digital controller 58. Referring to FIG. 17, the controller 58 may comprise one or more processors 22, one or more memories 24, and/or one or more communication interfaces 26. The communication interface 26 may comprise one or more input and/lor output devices (e.g., a display, touchscreen, speaker, or the like). The processor 22 (e.g., a microprocessor or a microcontroller) may communicate with the memory 24 for storing and/or accessing instructions and data (e.g., computer readable instructions and/or the operating parameters) in order to operate the door system 40 and provide the functionality described herein. Some of the one or more memories 24 are non-volatile, storing configuration information and program code. As used herein, a "processor" generally refers to a device or combination of devices having circuitry used for implementing the communication and/or logic functions of a particular system. For example, the processor 22 may include one or more digital signal processor devices, microprocessors, and/or microcontrollers and other support circuits and/or combinations of the foregoing. Control and signal processing functions of the system are allocated between these processing devices according to their respective capabilities. The controller 58 may further include functionality to operate one or more software programs based on computer-executable program code, which may be stored in memory 24. As the phrase is used herein, a controller 58 may be "configured to" perform a certain function in a variety of ways, including, for example, by having one or more general-purpose circuits perform the function, by executing particular computer-executable program code embodied in computer-readable medium, and/or by having one or more application-specific circuits perform the function.

The door systems 40 (e.g., door operator, door closer, or the like) can include computer program code which, when executed by the processor 22, causes the door systems 40 (e.g., door operator or door closer) to perform based on the stored operating parameters. A computer program product can include a medium with non-transitory computer program code that when executed causes the door system 40 to operate as described herein. The present invention may be embodied as a method, device, article, system, computer program product, or a combination of the foregoing. Any suitable computer usable or computer readable medium may be utilized for a computer program product to implement all or part of the system. The computer usable or computer readable medium may be, for example but not limited to, a tangible electronic, magnetic, optical, electromagnetic, or semiconductor system, apparatus or device. More specific examples of the computer readable medium may include, but is not limited to, the following: a portable computer diskette, a hard disk, a random-access memory (RAM), a read-only memory (ROM), an erasable programmable read-only memory (EPROM or Flash memory), a portable compact disc read-only memory (CD-ROM), or an optical storage device.

Computer program code for carrying out operations of the present invention or for assisting in the carrying out of a method according to an example embodiment of the invention may be written in an object oriented, scripted or unscripted programming language such as Java, Peri, python, C++ or the like. However, the computer program code for carrying out operations of the present invention may also be written in conventional procedural programming languages, such as the "C" programming language or similar programming languages. The computer program code may also be written in HTML5 or similar languages that are commonly used for applications or "apps" intended to be run on mobile computing devices such as smart phones, tablets, and the like. While specific examples of programming languages are described herein, these examples are not exhaustive, and the computer program code may be written in any suitable programming language.

Computer program instructions may be provided to the controller 58 to produce a machine, such that the instructions, which execute via the processor 22 of the controller 58, create a device for implementing the functions necessary to carry out the embodiments as described herein. Computer program instructions may also be provided as firmware for an embedded controller or a plurality of embedded controllers.

Referring to FIGS. 16 and 17, the controller 58 includes, or is in communication with, an onboard communication interface 26, such as a wired communication interface (as will be discussed below) and/or a wireless communication interface (e.g., wireless communication chip) that communicates with remote computer system(s) (e.g., a mobile devices, such as remote control, smartphone, laptops, desktops, servers, other door systems, or the like) over a wireless connection. It should be understood that the wireless communication may occur over any type of wireless network, or such communication may occur directly between the controller 58 and the remote computer system(s) such that the controller 58 does not require access to an external network (e.g., external Wi-Fi network, the cellular network or other external network). As used herein, the term "directly communicates" means that the remote computer system communicates with the on-board communication interface 26 without an intervening network such as an external wireless network (e.g., external Wi-Fi network, LAN or WAN, or other external wireless protocol). In some embodiments, the controller 58 may be directly coupled to, and may directly communicate with, remote computer system(s) (e.g., a mobile device, such as a remote control, smartphone, or the like) over a relatively short distance using a wireless communication interface 26. The controller 58 may be coupled to the remote computer system(s) via the wireless communication interface 26 that communicates using a wireless networking protocol, such as WiFi based on the institute of Electrical and Electronics Engineers (IEEE) 802.11 standards, Bluetooth short-wavelength UHF radio waves in the ISM band from 2.4 to 2.485 GHZ, a proprietary communication interface or other wireless access technology whether or not described herein.

While in some embodiments, the communication interface 26 communicates directly with the remote computer system(s) over a short range via a wireless connection such as WiFi, Bluetooth or other wireless access technology, a wireless connection may operate over long or intermediate ranges and may include intervening networks. In this regard, the door system 40 may comprise a transceiver that communicates with the controller 58 and that is configured to operate with one or more air interface standards, communication protocols, modulation types, and access types. By way of illustration, the door system 40 may include a transceiver that may be configured to operate in accordance with any of a number of first, second, third, fourth, fifth, tenth, and/or the like generation communication protocols and/or the like. For example, the door system 40 may be configured to operate in accordance with second-generation (2G) wireless communication protocols IS-136 (time division multiple access (TDMA)), GSM (global. system for mobile communication), and/or IS-95 (code division multiple access (CDMA)), or with third-generation (3G) wireless communication protocols, such as Consolidated Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 3GPP protocols, with fifth-generation (5G) wireless communication protocols, with tenth-generation (10G) wireless communication protocols, and/or the like. The door system 40 may also be configured to operate in accordance with non-cellular communication mechanisms, such as via a wireless local area network (WLAN) or other communication/data networks.

The controller 58 may communicate with the remote computer systems (e.g., a mobile device, such as a remote control, smartphone, or the like) over a wireless connection, directly or through an external network. The remote computer systems may be used to program the door system 40 to define (e.g., set, adjust, remove, or the like) the operating parameters of the door system 40 after the door system 40 is physically installed on the door/door frame. The remote computer system may comprise a mobile device, such as a cellular phone, tablet, dedicated terminal, laptop, remote control, or the like. The wireless connection between the remote computer system and the controller 58 may be implemented using dedicated applications (e.g., apps, applet, or the like), portions of dedicated applications, a web-browser based interface, and/or the like, or combinations of such systems. The controller 58 may act as a web server providing user interfaces (e.g., web pages, or the like) that may be accessed by the remote computer system over the wireless connection. The user interfaces can be used for setup, diagnostics, input and output programming, settings, or the like. The controller 58 may collect data for tracking, mapping, sensors, and communication with other devices, notifications (e.g., alerts, messages, or the like) of door activity, performance, maintenance, faulty accessories, installation, or the like.

The controller 58 is part of an overall control system which may include an activation device 36 in electrical communication with the controller 58 for allowing a user to selectively control actuation of the motor 102, and thus, the opening and/or closing of the door 42. The activation device 36 is operable to generate and transmit a door movement signal to the controller 58 which, in turn, is responsive to receiving the door movement signal to control operation of the motor 120 so as to control powered opening and/or closing of the door 42. The activation device 36 may be of any known or desired type. For example, the activation device 36 may consist of a manual push pad switch mounted on the wall 38, or a post, adjacent to the door 42. This arrangement is such that a user need only press the push pad to activate the door operator 40 to automatically open the door 42. In other embodiments, the activation device 36 may comprise a pressure pad such as in a switch-type floor mat. Various other activation devices are also suitable for use according to the present invention, including any type of switch, sensor, and/or actuator, including mechanical switching device, infrared motion sensors, radio frequency sensors, photoelectric cells, ultrasonic presence sensor switches, laser, and the like. As a result of the operation of some of these activation devices, an automatically operable door is caused to open by mere proximity of a person to the door. Such proximity may cause the door to operate by virtue of the activation device 36, such as interruption of a light beam (e.g., single beam, light curtain, or the like), distortion of an electrical field, by the actual physical closing of the switch by contact with the person or in response to the weight of the person approaching the door, or the like. The particular manner for generating a door movement signal to the controller 58 for energizing the drive system 52, such as the motor 120, may be accomplished by any suitable activation device.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, micro-code, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A door monitoring system for a door system operatively coupled to a door and configured to close the door, the door monitoring system comprising:

one or more sensors, wherein the one or more sensors are used to determine one or more operating parameters of the door being operated by the door system;

a braking system, wherein the braking system is engaged to slow the door when one of the one or more operating parameters are outside of one or more threshold operating parameters; and an anticipation circuit, wherein the anticipation circuit is configured to determine an anticipated position of the door at a future period, and wherein the anticipated position is based on a position signal and a speed signal obtained by the one or more sensors, wherein the braking system is configured to:

determine an anticipated speed based on the anticipated position; and determine when the anticipated speed exceeds an allowable speed and in response engage a relay to disconnect a drive circuit of the door system controlling the door and connect at least one braking resistor to a motor controlling the door to slow the door.

2. The door monitoring system of claim 1, wherein the one or more sensors comprise a position sensor that determines a position of a door, wherein the braking system comprises:

a position sensor, wherein the position sensor determines the position of a door by generating a position signal; and a speed filter, the speed filter configured to generate a speed signal from the position signal.

3. The door monitoring system of claim 2, wherein the braking system is further configured to:

determine a motor current from a current sensor for the motor controlling the door based on an output of the drive circuit; and determine when the motor current for the motor controlling the door exceeds a pre-determined motor current and engage the relay configured to disconnect the drive circuit controlling the door and connect the at least one braking resistor to the motor controlling the door to slow the door.

4. The door monitoring system of claim 2, wherein the at least one braking resistor comprises a plurality of braking resistors.

5. The door monitoring system of claim 1, wherein the sensor is a speed sensor.

6. A method for operating a door braking system, the method comprising:

determining, by a position sensor for a door, a position of the door;

determining, based on an output of the position sensor, a speed of the door;

determining, based on the output of the position sensor and the determined speed of the door, an anticipated position of the door at a future period;

determining, based on the anticipated position, an anticipated speed; and determining, based on the anticipated speed, when the anticipated speed exceeds an allowable speed and engage a relay configured to disconnect a drive circuit of the door braking system controlling the door and connect at least one braking resistor to a motor controlling the door to slow the door.

7. The door monitoring system of claim 2, wherein a portion of the position signal of the door from the position sensor comprises a latch check position, and wherein the latch check position is a latch check region comprising one or more latch check positions for the door.

8. The door monitoring system of claim 7, wherein the one or more latch check positions for the door is pre-determined.

9. The door monitoring system of claim 7, wherein the braking system further configured to:

determine a pre-latch check region, wherein the pre-latch check region comprises one or more different positions of the door different than the latch check region;

determine a distance of the door to the latch check region at a current time based on the position signal;

generate an anticipation limit signal based on combining the allowable speed and the distance of the door to the latch check region; and compare the anticipation limit signal and the speed signal to determine the anticipation signal.

10. The door monitoring system of claim 7, wherein the braking system is further configured to:

determine a pre-latch check region, wherein the pre-latch check region comprises one or more different positions of the door different than the latch check region;

generate an anticipation limit signal based on combining the speed signal and a position region signal, wherein the position region signal is based on the pre-latch region; and compare the anticipation limit signal and the position signal to determine the anticipation signal.

11. The door monitoring system of claim 2, wherein the braking system is further configured to:

determine a motor current from a current sensor for the motor controlling the door based on an output of the drive circuit; and determine when the motor current for the motor controlling the door exceeds a pre-determined motor current and engage the relay configured to disconnect the drive circuit controlling the door and connect the at least one braking resistor to the motor controlling the door to slow the door.

12. The door monitoring system of claim 11, wherein when at least one of the anticipated speed fails to exceed the allowable speed or when the motor current for the motor controller the door fails to exceed the pre-determined motor current and engage the relay to connect the drive circuit to the motor controlling the door.

13. The door monitoring system of claim 2, wherein the anticipated position and anticipated speed are based on a linear model.

14. The door monitoring system of claim 2, wherein the braking system further comprises:

a delay circuit, wherein the delay circuit engages the relay to electronically connect the at least one brake resistor to the motor controlling the door for a delay period.

15. The door monitoring system of claim 14, wherein the braking system is further configured to:

receive updated position signal from the position sensor in response to the delay circuit engaging the relay for the delay period;

determine an updated anticipated speed for door based on the updated position signal; and determine when the updated anticipated speed exceeds the allowable speed engage the relay to disconnect the drive circuit of the door system controlling the door and connect the at least one braking resistor to the motor for controlling the door to slow the door for the delay period.

16. The door monitoring system of claim 2, wherein the at least one braking resistor comprises a plurality of braking resistors.

17. The door monitoring system of claim 1, wherein the sensor is a speed sensor.

18. The door monitoring system of claim 1, wherein the braking system is configured such that a braking that is applied to the door to slow the door is variable.

19. The door monitoring system of claim 18, wherein the braking system is configured such that an amount of braking applied to the door and/or a time at which braking is applied to the door is variable.

20. The door monitoring system of claim 19, wherein the amount of braking applied to the door and/or the time at which braking is applied to the door is variable based on the one or more operating parameters of the door and/or one or more characteristics of the door.

21. The door monitoring system of claim 20, wherein the one or more characteristics of the door comprise a weight of the door.

22. A braking system for a door system operatively coupled to a door and configured to close the door, the braking system comprising:

a position filter configured to generate a position signal, wherein the position signal is received from a position sensor for the door;

a speed filter, the speed filter configured to generate a speed signal from the position signal;

an anticipation circuit, wherein the anticipation circuit is configured to determine an anticipated position of the door at a future period, and wherein the anticipated position is based on the position signal and the speed signal;

wherein the braking system is configured to:

determine an anticipated speed based on the anticipated position; and determine when the anticipated speed exceeds an allowable speed and in response engage a relay to disconnect a drive circuit of the door system controlling the door and connect at least one braking resistor to a motor controlling the door to slow the door.

23. The braking system of claim 22, wherein the braking system is further configured to determine when the anticipated speed fails to exceed the allowable speed and in response engage the relay configured to connect the drive circuit of the door system controlling the door to the motor controlling the door.

24. A method for operating a door braking system, the method comprising:

determining, by a position sensor for a door, a position of the door;

generating, by a position filter operatively coupled to the position sensor, a position signal;

generating, by a speed filter operatively coupled to the position filter, a speed signal based on the position signal;

determining, by an anticipation circuit configured to receive the position signal and the speed signal, an anticipated position of the door at a future period;

determining, based on the anticipated position, an anticipated speed; and determining, based on the anticipated speed, when the anticipated speed exceeds an allowable speed and engage a relay configured to disconnect a drive circuit of the door system controlling the door and connect at least one braking resistor to a motor controlling the door to slow the door.

25. A braking system for a door system operatively coupled to a door and configured to close the door, the braking system comprising:

a position sensor configured to sense a position of the door;

at least one controller configured to:

determine a speed of the door based on output from the position sensor;

determine an anticipated position of the door at a future period, and wherein the anticipated position is based on an output of the position sensor and the determined speed of the door;

determine an anticipated speed based on the anticipated position; and determine when the anticipated speed exceeds an allowable speed and in response engage a relay to disconnect a drive circuit of the door system controlling the door and connect at least one braking resistor to a motor controlling the door to slow the door.

26. The system of claim 25, further comprising a position filter configured to generate a position signal, wherein the position signal is received from the position sensor for the door.

27. A method for operating a door braking system, the method comprising:

determining, by a position sensor for a door, a position of the door;

determining, based on an output of the position sensor, a speed of the door;

determining, based on the output of the position sensor and the determined speed of the door, an anticipated position of the door at a future period;

determining, based on the anticipated position, an anticipated speed; and determining, based on the anticipated speed, when the anticipated speed exceeds an allowable speed and engage a relay configured to disconnect a drive circuit of the door braking system controlling the door and connect at least one braking resistor to a motor controlling the door to slow the door.

* * * * *